United States Patent
Park et al.

(10) Patent No.: US 10,411,302 B2
(45) Date of Patent: Sep. 10, 2019

(54) LITHIUM SECONDARY BATTERY

(71) Applicant: Samsung Electronics Co., Ltd., Suwon-si, Gyeonggi-do (KR)

(72) Inventors: Jonghwan Park, Suwon-si (KR); Junhyuk Moon, Seongnam-si (KR); Inhyuk Son, Seongnam-si (KR); Jaeman Choi, Seongnam-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 72 days.

(21) Appl. No.: 15/293,475

(22) Filed: Oct. 14, 2016

(65) Prior Publication Data

US 2017/0187070 A1 Jun. 29, 2017

(30) Foreign Application Priority Data

Dec. 24, 2015 (KR) ........................ 10-2015-0186786

(51) Int. Cl.
*H01M 6/00* (2006.01)
*H01M 10/0569* (2010.01)
(Continued)

(52) U.S. Cl.
CPC ....... *H01M 10/0569* (2013.01); *H01M 4/386* (2013.01); *H01M 4/485* (2013.01);
(Continued)

(58) Field of Classification Search
CPC ........... H01M 10/052; H01M 10/0525; H01M 10/0569; H01M 10/0568; H01M 4/386; H01M 4/485; H01M 4/366
See application file for complete search history.

(56) References Cited

U.S. PATENT DOCUMENTS

| | | | |
|---|---|---|---|
| 9,368,795 | B2 | 6/2016 | Izuhara et al. |
| 2013/0252101 | A1 | 9/2013 | Zhou et al. |

(Continued)

FOREIGN PATENT DOCUMENTS

| | | |
|---|---|---|
| JP | 2014-199749 A | 10/2014 |
| KR | 1020140023858 A | 2/2014 |

(Continued)

OTHER PUBLICATIONS

Hardwick et al., "FTIR and Raman Study of the $Li_xTi_yMn_{1-y}O_2$ (y=0, 0.11) Cathodes in Methylpropyl Pyrolidinium Bis(fluorosulfonyl)imide, LiTFSI Electrolyte", Journal of the Electrochemical Society, 156(2), 2009, A120-A127.

(Continued)

*Primary Examiner* — Raymond Alejandro
(74) *Attorney, Agent, or Firm* — Cantor Colburn LLP

(57) ABSTRACT

A lithium secondary battery includes: a negative electrode, a positive electrode, and an electrolyte disposed between the negative electrode and the positive electrode, wherein the negative electrode includes a silicon composite including silicon, a silicon oxide of the formula $SiO_x$ wherein $0<x<2$ and disposed on the silicon, and a graphene disposed on the silicon oxide; or a carbonaceous composite including the silicon composite and a carbonaceous material, which is different from the graphene, and wherein at least one of the negative electrode and the electrolyte includes an ionic liquid containing a fluorosulfonyl imide anion, and a lithium salt.

22 Claims, 26 Drawing Sheets

(51) Int. Cl.
  *H01M 4/38* (2006.01)
  *H01M 10/0568* (2010.01)
  *H01M 4/485* (2010.01)
  *H01M 10/052* (2010.01)
  *H01M 4/36* (2006.01)

(52) U.S. Cl.
  CPC ..... *H01M 10/052* (2013.01); *H01M 10/0568* (2013.01); *H01M 4/366* (2013.01); *Y02T 10/7011* (2013.01)

(56) References Cited

U.S. PATENT DOCUMENTS

| | | |
|---|---|---|
| 2015/0093648 A1 | 4/2015 | Son et al. |
| 2016/0164096 A1* | 6/2016 | Yokotsuji ............... H01M 4/62 429/338 |
| 2017/0047584 A1* | 2/2017 | Hwang ............... H01M 4/0471 |

FOREIGN PATENT DOCUMENTS

| | | | |
|---|---|---|---|
| KR | 1020150027022 A | 3/2015 | |
| KR | 1020150039555 A | 4/2015 | |
| WO | WO 2015/170918 | * 11/2015 | ............. H01M 4/38 |

OTHER PUBLICATIONS

Hu et al., "Electrochemical and in-situ scanning tunneling microscopy studies of bis(fluorosulfonyl)imide and bis (trifluoromethanesulfonyl)imide based ionic liquids on graphite and gold electrodes and lithium salt influence", Journal of Power Sources, 293, 2015, pp. 187-195.

Liu et al., "A promegranate-inspired nanoscale design for large-volume-change lithium battery anodes", Nature Nanotechnology, vol. 9, 2014, pp. 187-192.

Ng et al., "Highly Reversible Lithium Storage in Spheroidal Carbon-Coated Silicon Nanocomposites as Anodes for Lithium-Ion Batteries**'", Angew. Chem. Int. Ed., vol. 45, 2006, pp. 6869-6899.

Ogata et al., "Revealing lithium-silicide phase transformations in nano-structured silicon-based lithium ion batteries via in situ NMR spectroscopy", Nature Comm., 2014, pp. 1-11.

Hui Wu, et al., "Stable cycling of double-walled silicon nanotube battery anodes through solid-electrolyte interphase control", 2012, 6 pp. Nature Nanotechnology.

* cited by examiner

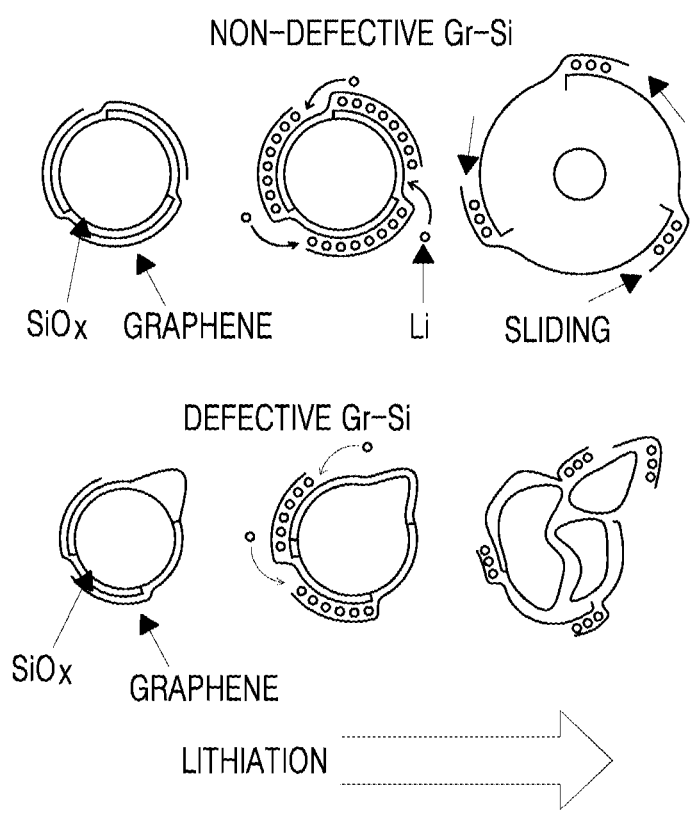

LITHIUM SECONDARY BATTERY

CROSS-REFERENCE TO RELATED APPLICATION

This application claims priority to and the benefit of Korean Patent Application No. 10-2015-0186786, filed on Dec. 24, 2015, in the Korean Intellectual Property Office, and all the benefits accruing therefrom under 35 U.S.C. § 119, the content of which in its entirety is herein incorporated by reference.

BACKGROUND

1. Field

The present disclosure relates to a lithium secondary battery.

2. Description of the Related Art

Silicon has been studied for use as a negative electrode material for lithium ion batteries since silicon has a high theoretical capacity of 4200 milliampere-hours per gram (mAh/g) and a low cost. However, silicon undergoes a volume expansion when alloyed with lithium during discharge of a battery to form $Li_{4.4}Si$ and thus the silicon active material becomes electrically isolated in the electrode and the electrolyte decomposition reaction increases according to the increase in the specific surface area of the silicon. To address these problems, a structure that reduces the volume expansion of the silicon so that it undergoes less pulverization has been developed or alternatively formation of a coating layer of carbon or the like on a surface of the silicon has been suggested. However, general silicon materials do not exhibit satisfactory volume expansion reduction effects or battery charging/discharging efficiency. There remains a need for improved lithium secondary battery materials.

SUMMARY

Provided is a lithium secondary battery with enhanced capacity retention and improved charging/discharging efficiency.

According to an aspect, a lithium secondary battery includes: a negative electrode, a positive electrode, and an electrolyte disposed between the negative electrode and the positive electrode, wherein the negative electrode includes a silicon composite including silicon, a silicon oxide of the formula $SiO_x$ wherein $0<x<2$ and disposed on the silicon, and a graphene disposed on the silicon oxide, or a carbonaceous composite including the silicon composite and a carbonaceous material, which is different from the graphene, and wherein at least one of the negative electrode and the electrolyte includes an ionic liquid containing a fluorosulfonyl imide anion and a lithium salt.

Additional aspects will be set forth in part in the description which follows and, in part, will be apparent from the description, or may be learned by practice of the presented exemplary embodiments.

BRIEF DESCRIPTION OF THE DRAWINGS

These and/or other aspects will become apparent and more readily appreciated from the following description of exemplary embodiments, taken in conjunction with the accompanying drawings in which:

FIG. 1E is a schematic view illustrating a method of implementing a clamping effect as a graphene layer helps silicon particles having no defect to expand and lithium ions to diffuse during a lithiation process;

DETAILED DESCRIPTION

Figure 1A:
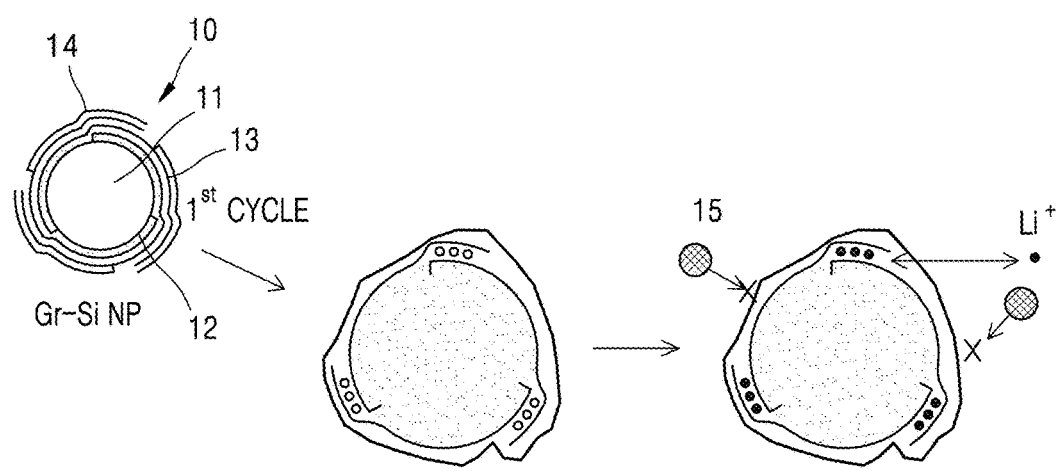
FIG. 1A is a schematic view illustrating a process in which a composite according to an exemplary embodiment forms a stable solid electrolyte interface (SEI) film.

Reference will now be made in detail to exemplary embodiments, examples of which are illustrated in the accompanying drawings, wherein like reference numerals refer to like elements throughout. In this regard, the present exemplary embodiments may have different forms and should not be construed as being limited to the descriptions set forth herein. Accordingly, the exemplary embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third," etc. may be used herein to describe various elements, components, regions, layers, and/or sections, these elements, components, regions, layers, and/or sections should not be limited by these terms. These terms are only used to distinguish one element, component, region, layer or section from another element, component, region, layer, or section. Thus, "a first element," "component," "region," "layer," or "section" discussed below could be termed a second element, component, region, layer, or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (e.g., the limitations of the measurement system). For example, "about" can mean within one or more standard deviations, or within ±30%, 20%, 10%, or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

A lithium secondary battery according to an exemplary embodiment will be described in more detail with reference to the accompanying drawings.

A lithium secondary battery according to an embodiment includes a negative electrode, a positive electrode, and an electrolyte disposed between the negative electrode and the positive electrode, wherein the negative electrode includes i) a silicon composite including silicon (Si), a silicon oxide of the formula SiO$_x$ wherein 0<x<2 disposed on the silicon, and a graphene disposed on the silicon oxide or ii) a carbonaceous composite including the silicon composite and a carbonaceous material, which is different from the graphene, and wherein at least one of the negative electrode and the electrolyte includes i) an ionic liquid containing a fluorosulfonyl imide anion and ii) a lithium salt.

According to an embodiment, the electrolyte includes an ionic liquid containing a fluorosulfonyl imide anion and a lithium salt.

The fluorosulfonyl imide anion may be, for example, (FSO$_2$)$_2$N$^-$, (CF$_3$SO$_2$)$_2$N$^-$, (C$_2$F$_5$SO$_2$)$_2$N$^-$, (C$_2$F$_5$SO$_2$)(CF$_3$SO$_2$)N$^-$, or (FSO$_2$)(CF$_3$SO$_2$)N$^-$.

A silicon material is pulverized due to the volume expansion occurring during battery charging and discharging, or an interface between new electrolyte and a silicon active material is continuously formed, which causes a side reaction therebetween. Thus, a lithium secondary battery employing a negative electrode including such silicon material has reduced charging/discharging efficiency and deteriorated lifespan characteristics.

To address the aforementioned problems, a composite has been proposed, in which a graphene is grown on a silicon oxide on silicon. However, when an electrolyte including a carbonate solvent is used, the composite may form an unstable solid electrolyte interface (SEI) film due to decomposition of the electrolyte at the basal-plane site and edge-plane site of graphene. As such, when an unstable protective film is formed, silicon pulverization or formation of irreversible c-$Li_xSi$ due to overcharging may occur. As a result, an interface is continuously formed between the new electrolyte and the active material, which causes a side reaction therebetween. In addition, irreversible capacity is generated due to formation of crystalline $Li_xSi$ in the vicinity of 50 mV (vs. Li/Li$^+$) during lithiation. Thus, a lithium secondary battery employing a negative electrode including such a composite exhibits reduced durability and deteriorated charging/discharging efficiency due to the decrease in capacity.

Therefore, to address the above-described problems, the present inventors provide a lithium secondary battery in which, as illustrated in FIG. 1A, an electrochemically stable protective film 14 is disposed on a surface of graphene 13 of a composite 10 by using an electrolyte 15 including an ionic liquid containing a fluorosulfonyl imide anion. Accordingly, the side reaction between a surface of silicon of the composite 10 and the electrolyte 15 is effectively suppressed. In such a lithium secondary battery, formation of crystalline $Li_xSi$ is suppressed due to the prevention of overcharging by the stable protective film 14, thus increasing capacity durability of the lithium secondary battery.

The lithium salt may be any suitable lithium salt including those used in the art. For example, the lithium salt may be LiSCN, $LiN(CN)_2$, $LiClO_4$, $LiBF_4$, $LiAsF_6$, $LiPF_6$, $LiCF_3SO_3$, $Li(CF_3SO_2)_2N$ ("LiTFSI"), $LiSbF_6$, $Li(CF_3SO_2)_3C$, $LiPF_3(CF_2CF_3)_3$, $LiPF_3(CF_3)_3$, $LiB(C_2O_4)_2$, $Li(FSO_2)_2N$ ("LiFSI"), $LiN(SO_2C_2F_5)(CF_3SO_2)$, $LiN(SO_2C_2F_5)_2$, $LiPF_3(CF_2CF_3)_3$, LiCl, LiI, or a mixture thereof. The lithium salt may be, for example, a lithium salt including a fluorosulfonyl imide anion, such as LiTFSI or LiFSI.

The composite 10 has a structure including silicon (Si) 11, a silicon oxide 12 of the formula $SiO_x$ where 0<x<2 disposed on the silicon 11, and a graphene 13 disposed on the silicon oxide 12. The graphene 13 has a structure that is directly grown on the silicon oxide 12. In this regard, the graphene 13 may be in the form of a film or a nanosheet. Referring to FIG. 1A, the graphene 13 has a film type.

Figure 1B:
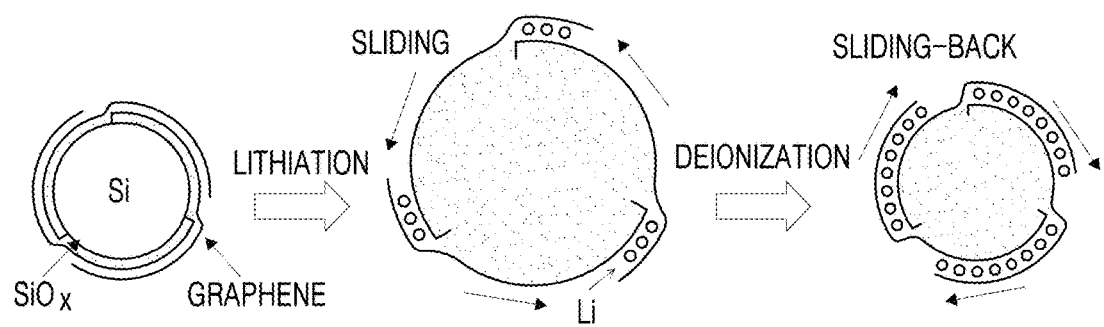
FIG. 1B is a schematic view illustrating a method of implementing a clamping effect as a graphene layer helps silicon particles to expand and lithium ions to diffuse during a lithiation process.

As illustrated in FIG. 1B, the composite 10 has a protective film for preventing a reaction between a surface of silicon and the electrolyte such that the graphene film can slide according to the volumetric change of silicon during charging and discharging of the lithium battery. Accordingly, the surface of the silicon is protected. In addition, in the composite 10, a graphene with a high conductivity and pliable to volume expansion is directly grown on the surface of silicon and accordingly, volume expansion is suppressed and pulverization of the silicon may be reduced. Moreover, the opportunity of direct contact between the silicon and the electrolyte may be reduced by the graphene, thus reducing the formation of an SEI layer.

As a result of comparison of X-ray photoelectron spectrometry (XPS) analysis results between a case in which an electrolyte including an ionic liquid containing a fluorosulfonyl imide anion, such as an fluorosulfonyl imide (FSI) anion is used and a case in which an electrolyte including an ionic liquid containing other anions (e.g., $PF_6^-$, $BF_4^-$, or the like) is used, a protective film disposed on a surface of the composite in the former case has large volume molecules such as $Li_2SO_4$, $SO_xLi_2S$, $Si_3N$, $NSO_2$, or the like, while a protective film formed in the latter case has small volume molecules such as LiF. Thus, when the electrolyte including an ionic liquid containing other anions is used, electrolyte molecules are considered to more easily contact a surface of a negative electrode by passing through the protective film, as compared to the case in which an electrolyte including an ionic liquid containing a fluorosulfonyl imide anion is used. According to the comparison results, when the electrolyte including an ionic liquid containing a fluorosulfonyl imide anion is used, a more electrochemically stable protective film is disposed on the surface of the composite, as compared to the case in which an electrolyte including an ionic liquid containing other anions (e.g., $PF_6^-$, $BF_4^-$, or the like) is used.

The ionic liquid containing a fluorosulfonyl imide anion may be at least one selected from compounds having: at least one cation selected from ammonium cations, pyrrolidinium cations, pyridinium cations, pyrimidinium cations, imidazolium cations, piperidinium cations, pyrazolium cations, oxazolium cations, pyridazinium cations, phosphonium cations, sulfonium cations, and triazolium cations; and at least one anion selected from $(FSO_2)_2N^-$, $(CF_3SO_2)_2N^-$, $(C_2F_5SO_2)_2N^-$, $(C_2F_5SO_2)(CF_3SO_2)N^-$, and $(FSO_2)(CF_3SO_2)N^-$.

The ionic liquid containing a fluorosulfonyl imide anion may be, for example, N-methyl-N-propylpyrrolidinium bis(fluorosulfonyl)imide, N-methyl-N-propylpyrrolidinium bis(trifluoromethanesulfonyl)imide, N-butyl-N-methylpyrrolidinium bis(3-trifluoromethylsulfonyl)imide, N-butyl-N-methylpyrrolidinium bis(fluorosulfonyl)imide, 1-butyl-3-methylimidazolium bis(trifluoromethylsulfonyl)imide, 1-butyl-3-methylimidazolium bis(fluorosulfonyl)imide, 1-ethyl-3-methylimidazolium bis(trifluoromethylsulfonyl)imide and 1-ethyl-3-methylimidazolium bis(fluorosulfonyl)imide.

The amount of the ionic liquid containing a fluorosulfonyl imide anion may be from about 1 part by weight to about 95 parts by weight, for example, from about 70 parts by weight to about 90 parts by weight, based on 100 parts by weight of the electrolyte. When the amount of the ionic liquid containing a fluorosulfonyl imide anion is within the above range, a lithium secondary battery with excellent charging/discharging efficiency and capacity retention may be manufactured.

In the electrolyte according to an embodiment, the amount of the lithium salt may be from about 0.2M to about 2M, for example, from about 0.5M to about 1.0M. When the amount of the lithium salt is within the above range, the electrolyte has an appropriate viscosity and thus there is no risk of leakage of the electrolyte. In addition, a lithium secondary battery with high charging/discharging efficiency and capacity retention may be manufactured.

2D peaks obtained by Raman analysis appear at about 2600 to about 2750 cm$^{-1}$. The Raman analysis results are obtained by measurement with light having a wavelength of 514 nm. An intensity ratio of D and G (D/G) obtained by Raman analysis may be from about 1.0 to about 4.0, for example, 2.0, and an intensity ratio of G and 2D (G/2D) of graphene obtained by Raman analysis may be from about 1.0 to about 6.0, for example, 2.0. The graphene has a high crystallinity when having the Raman analysis characteristics described above.

According to an embodiment, the electrolyte has a viscosity of about 50 cp to about 300 cp, for example, about 150 cp to 223 cp. When the viscosity of the electrolyte is within the above range, it is easy to inject the electrolyte into a lithium secondary battery and there is no risk of leakage of the electrolyte. In addition, when such electrolyte is used, high bending durability may be achieved, which enables the manufacture of a flexible battery.

In the composite according to an embodiment, a silicon oxide of the formula $SiO_x$ where $0<x<2$, which is a natural oxide disposed on silicon, is not removed and rather used as a seed layer material for forming graphene and as a result, graphene is disposed on the silicon. The shape, structure, thickness and the like of graphene may be adjusted using the silicon oxide as a seed layer material according to the purpose of use.

The silicon oxide of the formula $SiO_x$ where $0<x<2$ is an unstable material which lacks oxygen compared to silica ($SiO_2$) and has a tendency to form a stable material by reacting with other reactive materials such as carbon source gas. By utilizing the tendency of the silicon oxide of the formula $SiO_x$ where $0<x<2$, a silicon oxide film is used as a seed layer material for forming graphene.

The thickness of the silicon oxide ($SiO_x$ where $0<x<2$) film disposed on silicon has a very important effect on the shape, structure and the like of the graphene. The thickness of the silicon oxide ($SiO_x$ where $0<x<2$) film may be changed using a manufacturing process used in the formation of graphene, e.g., the composition of carbon source gas needed to form graphene. The thickness of the silicon oxide ($SiO_x$ where $0<x<2$) film may be 300 μm or less. According to an embodiment, the thickness of the silicon oxide ($SiO_x$ where $0<x<2$) film of the composite used in a battery may be 10 nanometer (nm) or less, for example, from about 0.1 to about 10 nm, for example, from about 0.1 nm to about 5 nm. When the composite including the silicon oxide ($SiO_x$ where $0<x<2$) film having the thickness within the above ranges is used, a lithium secondary battery with excellent capacity characteristics is obtained.

According to an embodiment, the graphene is disposed on the silicon oxide ($SiO_x$ where $0<x<2$) film of the silicon by gaseous carbon deposition that does not use a catalyst.

The gaseous carbon deposition is performed by heat-treating silicon coated with a silicon oxide of the formula $SiO_x$ in an atmosphere comprising at least one gas selected from a compound represented by Formula 1 below, a compound represented by Formula 2 below, and an oxygen-containing gas represented by Formula 3 below:

$$C_nH_{(2n+2-a)}[OH]_a \quad \text{Formula 1}$$

wherein in Formula 1, n is an integer of 1 to 20 and a is 0 or 1, $$C_nH_{(2n)} \quad \text{Formula 2}$$

wherein in Formula 2, n is an integer of 2 to 6, $$C_xH_yO_z \quad \text{Formula 3}$$

wherein in Formula 3, x is an integer of 1 to 20, y is 0 or an integer of 1 to 20, and z is 1 or 2.

The gaseous carbon deposition described above, without being limited to the theory that is disclosed herein, is believed to be related to reforming of the silicon covered with the silicon oxide of the formula $SiO_x$ included in the gas mixture by using $CO_2$. For example, when the compound of Formula 1 is methane (i.e., n is 1 and a is 0 in Formula 1), it may be understood that carbon deposition occurs on a composite oxide based on a reaction (e.g., a Boudouard reaction of Reaction Scheme 2) that occurs as a side reaction in the reforming reaction of Reaction Scheme 1. Also, it may be understood that carbon deposition occurring from decomposition of the compound of Formula 1, e.g., the reaction of Reaction Scheme 3 in the case of methane, is used.

 Reaction Scheme 1

 Reaction Scheme 2

 Reaction Scheme 3

However, the reaction that may occur during the heat treatment process of the carbon coating method is not limited to the reaction described above, and reactions other than the foregoing reaction may occur.

According to the gaseous carbon deposition described above, graphene is grown directly on silicon covered with a silicon oxide ($SiO_x$) and thus the graphene is closely adhered to the silicon.

According to another embodiment, even when a $SiO_x$ layer is not present on the silicon, a $SiO_x$ layer may be first formed on the silicon by reaction with an oxygen-containing gas mixture. Then graphene may be formed thereon by reaction with a carbon gas mixture through a process of reacting the carbon gas mixture and the oxygen-containing gas mixture.

An adherency between the silicon and the graphene may be evaluated by using a distance between a silicon of the silicon oxide ($SiO_x$) thereon and the graphene as determined with a scanning electron microscope. The distance between the graphene and the silicon of the silicon oxide ($SiO_x$) may be about 10 nm or less, for example, from about 0.5 nm to about 10 nm. In another embodiment, the distance between the graphene and the silicon of the silicon oxide ($SiO_x$) may be about 1 nm or less, for example, from about 0.5 nm to about 1 nm. In the composite, the graphene extends from the silicon of the silicon oxide ($SiO_x$) by a distance of 1 nm or less, for example, from about 0.5 nm to about 1 nm and thus the adherency and uniformity therebetween are very high. In addition, the graphene may be oriented at an angle ranging from about 0° to about 90° with respect to a primary axis of the silicon. The graphene may include one to 20 layers of graphene, and the total thickness of the graphene may be about 0.6 nm to about 12 nm. In addition, the graphene may be oriented at an angle ranging from about 0° to about 90° with respect to a primary axis of the silicon.

In the composite, about 90% or greater, for example, from about 90% to about 100%, for example, from about 99% to about 100%, for example, from about 99.5% to about 99.99% of the graphene extends from silicon nanoparticles with the silicon oxide ($SiO_x$) film formed thereon by a distance of about 1 nm or less and is uniformly positioned.

A shape of the silicon is not limited, and may be, for example, at least one selected from nanowires, nanoparticles, nanotubes, nanorods, a wafer, and nanoribbons.

In an embodiment, the silicon may have a shape of a nanowire. In this regard, a cross-sectional diameter of the silicon nanowire may be less than about 500 nm, for example, from about 100 nm to about 300 nm. In addition, the nanowire may have a diameter of greater than about 50 nm, for example, from about 50 nm to about 100 nm.

In an embodiment, a silicon oxide ($SiO_x$ where $0<x<2$) film is disposed on silicon nanowires, and graphene may be formed thereon.

In another embodiment, a silicon oxide ($SiO_x$ where $0<x<2$) film may be disposed on silicon nanoparticles, and graphene may be formed thereon. In this regard, the silicon nanoparticles may have an average diameter of from about 1 μm to 40 μm, for example, from about 40 nm to about 100 nm.

When the silicon has a wafer shape, the silicon wafer may have a thickness of about 2 mm or less, for example, from about 0.001 mm to about 2 mm.

The graphene is a polycyclic aromatic molecule containing a plurality of carbon atoms that are covalently bonded to one another. The covalently bonded carbon atoms form a 6-membered ring as a basic repeating unit, but may further include a 5-membered ring and/or a 7-membered ring. As a result, the graphene may appear as a single layer of the covalently bonded carbon atoms (generally, having a $sp^2$ bond). The graphene may be a single layer or multiple layers of carbon stacked one upon another, e.g., about 1 layer to about 100 layers, for example, about 2 layers to about 100 layers, for example, about 3 layers to about 50 layers.

The graphene may be in the form of a nanosheet or a layer (or a film).

The terms "nanosheet" and "layer" used herein are defined as follows. The term "nanosheet" denotes a structure disposed in an irregular form on the silicon oxide and the term "layer" denotes a structure that is continuously and uniformly disposed on the silicon oxide.

Figure 1C:
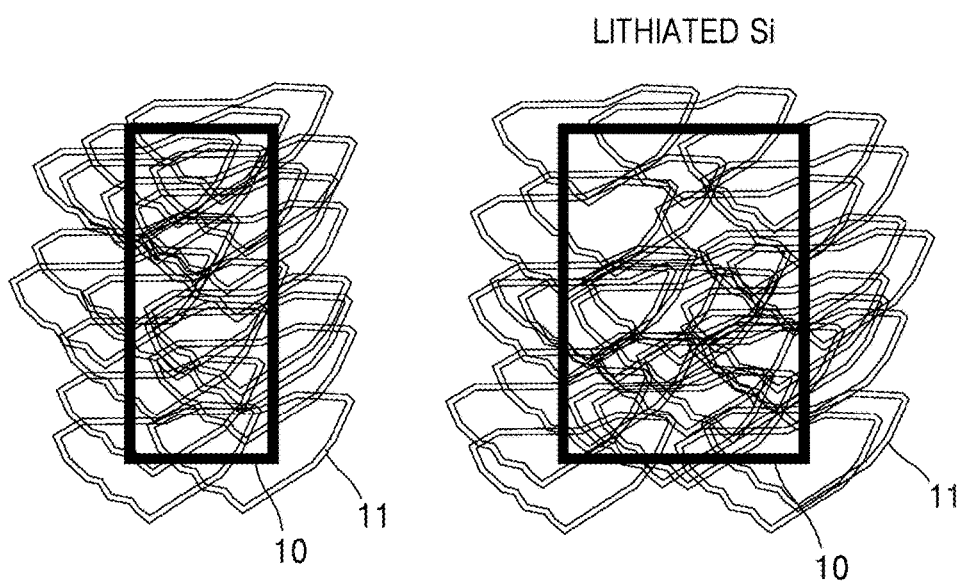
FIG. 1C is a schematic view illustrating an exemplary embodiment in which graphene in the form of a nanosheet is disposed on silicon wires with a silicon oxide thereon.

The view on the left side of FIG. 1C illustrates a composite in which a graphene nanosheet 11 is disposed on a silicon wire 10 covered with a silicon oxide. The view on the left side of FIG. 1D illustrates a composite in which a graphene film 11 is disposed on a silicon wire 10 covered with a silicon oxide.

Figure 1D:
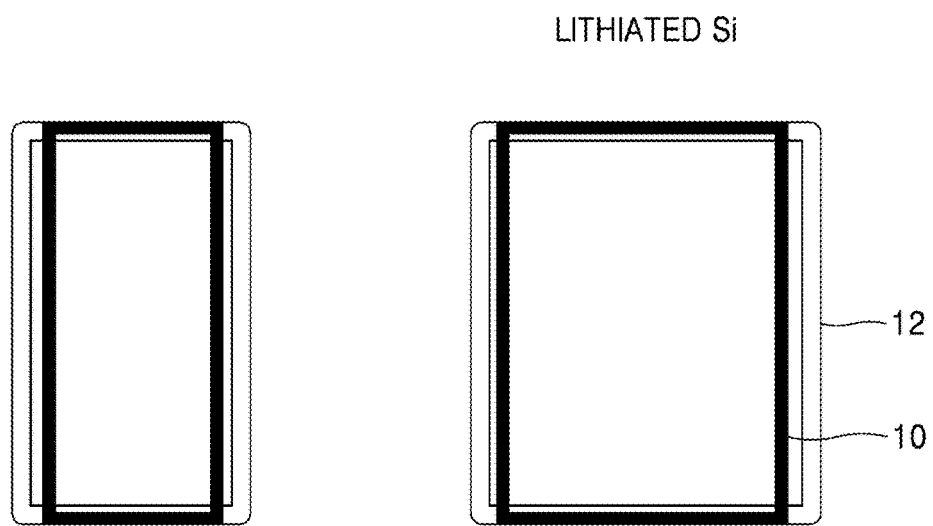
FIG. 1D is a schematic view illustrating an exemplary embodiment in which graphene in the form of a film is disposed on silicon wires with a silicon oxide thereon.

Views on the right sides of FIGS. 1C and 1D illustrate lithiated composites used as a negative active material.

FIG. 1B is a view illustrating the clamping effect in which, during lithiation, a graphene film helps to inflate silicon nanoparticles and to diffuse lithium ions.

A graphene encapsulation layer serves to suppress particle crushing and pulverization which occur in general silicon particles. A graphene sliding layer acts as a clamping layer that prevents disintegration of silicon particles. In addition, an alloying reaction between lithium ions and Si proceeds and as a result, a conducting path with a very high specific capacity and being continuously formed between particles is provided.

When silicon particles are swollen, graphene layers slide with respect to each other and return to a relaxed position by sliding during delithiation. Such movement occurs because the van der Waals force is greater than the interlayer frictional force.

From the test results that even after about 200 cycles of lithiation/delithiation are repeated, the graphene layer(s) remains the same, it may be confirmed that the graphene layer acts as a clamping layer for preventing the disintegration of silicon particles.

As illustrated in FIG. 1E, it may be confirmed that non-defective composite particles undergo a consistent volume expansion in a radial direction after lithiation, while defective composite particles undergo a structural deformation after lithiation. From the foregoing result, it is confirmed that the graphene layer has a greater effect in suppressing pulverization and crushing of silicon nanoparticles, which occur due to the volume expansion thereof during lithiation and delithiation, and lithium rapidly diffuses through the graphene layer, which results in uniform diffusion of lithium ions into a silicon core.

In the composite according to an embodiment, the amount of the graphene may be from about 0.001 parts by weight to about 90 parts by weight, for example, from about 0.01 parts by weight to about 20 parts by weight, for example, from about 0.01 parts by weight to about 10 parts by weight, based on 100 parts by weight of the composite. When the amount of the graphene is within the above range, the graphene has a great effect on suppressing the volume of the silicon and a high conductivity.

The composite may further include a metal oxide. As such, when the composite further including a metal oxide is used, a side reaction may be suppressed, thus preventing the formation of an SEI layer.

The metal oxide includes at least one selected from magnesium oxides, manganese oxides, aluminum oxides, titanium oxides, zirconium oxides, tantalum oxides, tin oxides, hafnium oxides, and aluminum fluoride ($AlF_3$).

In the composite according to an embodiment, the graphene may act as an SEI stabilization clamping layer. In addition, the graphene has a high specific surface area and thus a decrease in initial efficiency and volume energy density of a battery using such graphene may be prevented.

In the composite, the graphene may suppress the crushing and pulverization of an active material such as silicon and have an enhanced conductivity.

In the lithium secondary battery according to an embodiment, the carbonaceous composite includes the composite described above and a carbonaceous material. The carbonaceous composite has further enhanced initial efficiency, rate characteristics and durability as compared to the composite. The carbonaceous material includes at least one selected from graphite, graphene, and carbon nanotubes (CNTs). The carbonaceous material of the carbonaceous composite may be different from the graphene of the silicon composite.

In the carbonaceous composite, the amount of the carbonaceous material may be about 50 parts by weight or less, for example, from about 0.0001 parts by weight to about 50 parts by weight, based on 100 parts by weight of the carbonaceous composite. In an embodiment, the amount of the carbonaceous material may be from about 0.0001 parts by weight to about 30 parts by weight, for example, from about 0.0001 parts by weight to about 20 parts by weight, based on 100 parts by weight of the carbonaceous composite.

The amount of the carbonaceous material may be from about 0.001 parts by weight to about 10 parts by weight, for example, from about 0.01 parts by weight to about 5 parts by weight. When the amount of the carbonaceous material is within the above range, a carbonaceous composite with high capacity and conductivity may be obtained.

The carbonaceous composite includes, for example, graphite and a composite disposed on the graphite. The composite has a structure including silicon wires covered with a silicon oxide ($SiO_x$ where $0<x<2$) film and a graphene layer or a graphene nanosheet disposed on the silicon oxide film of the silicon wires.

The graphite may be, for example, SFG6 graphite and may have an average particle diameter of, for example, about 6 μm. The silicon wires have a diameter of about 50 nm and a length of about 400 nm.

When an electrode is formed using the carbonaceous composite, the amount of the carbonaceous composite in the electrode may be, for example, from about 68 parts by weight to about 87 parts by weight and the amount of a binder may be, for example, from about 13 parts by weight to about 32 parts by weight. The amount of the graphite in the carbonaceous composite may be, for example, from about 1 part by weight to about 20 parts by weight based on 100 parts by weight of the carbonaceous composite.

The binder may be, for example, a lithium-substituted polyacrylate.

Hereinafter, a method of preparing a composite according to an embodiment will be described.

The method includes supplying a carbon source gas to a structure including silicon and a silicon oxide of the formula $SiO_x$ where $0<x<2$ and heat-treating the resulting structure.

The carbon source gas may be at least one selected from the compound of Formula 1, the compound of Formula 2, and the oxygen-containing gas of Formula 3.

Each of the compound of Formula 1 and the compound of Formula 2 may be at least one selected from methane, ethylene, propylene, methanol, ethanol, and propanol. The oxygen-containing gas of Formula 3 includes, for example, carbon dioxide ($CO_2$), carbon monoxide (CO), water vapor ($H_2O$), or a mixture thereof.

In addition to the carbon source gas, at least one inert gas selected from nitrogen, helium, and argon may be further used.

The oxygen-containing gas may be at least one selected from carbon monoxide, carbon dioxide, and water vapor.

When the carbon source gas is the oxygen-containing gas, the thickness of the silicon oxide film may be greater than that of a natural silicon oxide film. For example, the thickness of the silicon oxide film may be adjusted to be about 10 nm or less, for example, from about 0.5 nm to about 5 nm. When the thickness of the silicon oxide film is within the above range, the shape and thickness of the graphene may be adjusted. More particularly, when the thickness of the silicon oxide film is greater than that of the natural oxide film so as to be within the aforementioned thickness range, a graphene layer having a compact structure, as compared to a graphene nanosheet disposed on the silicon oxide layer, may be obtained. In this regard, the graphene layer has, for example, a 5- to 10-layered structure.

When the gas mixture includes water vapor, the composite obtained as a result may have a greater conductivity than when water vapor is included. Although not limited to a particular theory, it is believed that carbon with a high degree of crystallinity is deposited on the silicon covered with a silicon oxide by the reaction of the gas mixture in the presence of water vapor, and thus the composite may have a high conductivity even when the silicon is coated with a small amount of carbon. The amount of water vapor in the gas mixture is not particularly limited and may be, for example, from about 0.01 volume percent (vol %) to about 10 vol % based on 100 vol % of the carbon source gas.

The carbon source gas may be, for example, methane, a gas mixture including methane and an inert gas, an oxygen-containing gas, or a gas mixture including methane and an oxygen-containing gas.

In an embodiment, the carbon source gas may be a gas mixture of $CH_4$ and $CO_2$ or a gas mixture of $CH_4$, $CO_2$, and $H_2O$. The gas mixture of $CH_4$ and $CO_2$ may be provided at a molar ratio of about 1:0.20 to 0.50, for example, from about 1:0.25 to 0.45, for example, from about 1:0.30 to 0.40, for $CH_4$ and $CO_2$. The gas mixture of $CH_4$, $CO_2$, and $H_2O$ may be provided at a molar ratio of about 1:0.20 to 0.50:0.01 to 1.45, for example, about 1:0.25 to 0.45:0.10 to 1.35, for example, about 1:0.30 to 0.40:0.50 to 1.0, for $CH_4$, $CO_2$, and $H_2O$.

In another embodiment, the carbon source gas may be carbon monoxide (CO) or carbon dioxide ($CO_2$). In another embodiment, the carbon source gas is a gas mixture of $CH_4$ and $N_2$. The gas mixture of $CH_4$ and $N_2$ may be provided at a molar ratio of about 1:0.20 to 0.50, for example, about 1:0.25 to 0.45, for example, about 1:0.30 to 0.40, for $CH_4$: $N_2$. In another embodiment, the carbon source gas may not include an inert gas, such as nitrogen.

The heat treatment process may be performed at a temperature ranging from about 700° C. to about 1100° C., for example, from about 700° C. to about 1000° C.

In the heat treatment process, a pressure is not limited and may be selected in consideration of a heat treatment temperature, a composition of a gas mixture, and a desired amount of carbon coating. The heat treatment pressure may be adjusted by changing the amount of supply and discharge of the gas mixture. For example, the heat treatment pressure may be about 1 atm or higher, for example, about 2 atm or higher, for example, about 3 atm or higher, for example, about 4 atm or higher, for example, about 5 atm or higher, but is not limited thereto.

A heat-treating time is not particularly limited but may be appropriately adjusted depending on a heat treatment temperature, a heat treatment pressure, a composition of a gas mixture, and a desired amount of carbon coating. For example, the reaction time may be from about 10 minutes to about 100 hours, for example, from about 30 minutes to about 90 hours, for example, from about 50 minutes to about 40 hours, but is not limited thereto. Without being limited by theory, it is believed that since the amount of graphene (carbon) deposited increases as time passes, electrical and physical properties of the composite may be enhanced accordingly. However, such tendency may not be always in direct proportion to time. For example, no further graphene deposition may occur or a deposition rate of the graphene may decrease after a predetermined period of time.

The method of preparing a composite may provide a uniform coating of graphene on the silicon covered with the silicon oxide ($SiO_x$) even at a relatively low temperature through a gas phase reaction of the carbon source gas described above. In addition, delamination of the graphene disposed on the silicon covered with the silicon oxide ($SiO_x$) layer does not substantially occur. When the thickness of the silicon oxide film is suitable, the delamination of the graphene may be even further suppressed. In this regard, the thickness of the silicon oxide layer that may efficiently suppress the delamination of the graphene may be about 10 nm or less, for example, from about 0.1 nm to about 10 nm, for example, from about 0.1 nm to about 5 nm.

Also, since the graphene is coated on the silicon through the gas phase reaction, a coating layer with a high degree of crystallinity may be formed, and thus when the composite is used as a negative active material, the negative active material may have an increased conductivity without a structural change of the composite.

The carbonaceous composite according to an embodiment may be prepared by mixing a composite, including silicon covered with a silicon oxide and graphene disposed on the silicon, and a carbonaceous material and heat-treating the resulting mixture. In this regard, the heat treatment process is performed at a temperature ranging from about 700° C. to about 1000° C. When the heat treatment temperature is within the above range, a carbonaceous composite with excellent capacity characteristics may be obtained.

Hereinafter, a method of manufacturing a lithium secondary battery according to an embodiment will be described.

First, a negative electrode is prepared according to a negative electrode fabrication method.

The negative electrode using the composite or the carbonaceous composite may be manufactured by molding a negative active material composition including the composite or the carbonaceous composite, a conductive agent, and a binder in a certain shape or coating the negative active material composition on a current collector, such as a copper foil. The conductive agent may be omitted in the composition.

In another embodiment, the negative active material composition may be formed as a film on a separator without the current collector.

In particular, the negative active material composition is prepared by mixing a negative active material, a conductive agent, a binder, and a solvent. A negative electrode plate is manufactured by directly coating the negative active material composition on a metal current collector. In some embodiments, a negative electrode plate may be manufactured by casting the negative active material composition on a separate support and then laminating a film separated from the support on a metal current collector. The negative electrode fabrication method is not limited to the above-described examples and the negative electrode may be manufactured using various other methods.

The negative active material composition may further include other carbonaceous negative active materials in addition to the negative active material described above. For example, the carbonaceous negative active material may be at least one selected from natural graphite, artificial graphite, expandable graphite, graphene, carbon black, fullerene soot, carbon nanotubes, and carbon fibers, but is not limited thereto, and any suitable carbonaceous negative active material used in the art may be used.

In addition, the conductive agent may be acetylene black, Ketjen black, natural graphite, artificial graphite, carbon black, carbon fibers, a metal powder of copper, nickel, aluminum, silver, or the like, metal fibers, or the like. In addition, at least one selected from conductive materials such as polyphenylene derivatives and the like may be used in combination, but is not limited thereto, and any conductive agent used in the art may be used.

The binder may be a vinylidene fluoride/hexafluoropropylene copolymer, polyvinylidenefluoride (PVDF), polyacrylonitrile, polymethyl methacrylate, polytetrafluoroethylene (PTFE), a mixture thereof, a styrene-butadiene rubber copolymer, polyacrylic acid, polyamideimide, polyimide, or the like, but is not limited thereto, and any suitable binder, including those used in the art may be used.

The solvent may be N-methylpyrrolidone, acetone, water, or the like, but is not limited thereto, and any suitable solvent, including those used in the art may be used.

The amounts of the negative active material, the conductive agent, the binder, and the solvent are those levels commonly used in lithium batteries and can be determined by one of ordinary skill in the art without undue experimentation. At least one of the binder and the solvent may be omitted depending on use and configuration of a lithium battery, if desired.

In an embodiment, the negative electrode may include an electrolyte including i) an ionic liquid containing a fluorosulfonyl imide anion and ii) a lithium salt. In this regard, the lithium salt may be any suitable lithium salt commonly used in the manufacture of a lithium secondary battery. For example, the lithium salt may be at least one selected from lithium salts containing a fluorosulfonyl imide anion, e.g., $Li(CF_3SO_2)_2N$, $Li(FSO_2)_2N$, $LiN(SO_2C_2F_5)(CF_3SO_2)$, $LiN(SO_2C_2F_5)_2$, and $LiPF_3(CF_2CF_3)_3$.

Next, a positive active material composition is prepared by mixing a positive active material, a conductive agent, a binder, and a solvent. The positive active material composition may be coated directly on a metal current collector and dried to manufacture a positive electrode plate. In another embodiment, a positive electrode plate may be manufactured by casting the positive active material composition on a separate support and then laminating a film separated from the support on a metal current collector.

The positive active material may include at least one selected from lithium cobalt oxide, lithium nickel cobalt manganese oxide, lithium nickel cobalt aluminum oxide, lithium iron phosphorous oxide, and lithium manganese oxide, but embodiments are not limited to the above examples, and any suitable positive active material used in the art may be used.

For example, the positive active material may be a compound represented by any of following formulas: $Li_aA_{1-b}B'_bD_2$ where $0.90 \leq a \leq 1.8$ and $0 \leq b \leq 0.5$; $Li_aE_{1-b}B'_bO_{2-c}D_c$ where $0.90 \leq a \leq 1.8$, $0 \leq b \leq 0.5$, and $0 \leq c \leq 0.05$; $LiE_{2-b}B'_bO_{4-c}D_c$ where $0 \leq b \leq 0.5$ and $0 \leq c \leq 0.05$; $Li_aNi_{1-b-c}Co_bB'_cD_\alpha$ where $0.90 \leq a \leq 1.8$, $0 \leq b \leq 0.5$, $0 \leq c \leq 0.05$, and $0 < \alpha \leq 2$; $Li_aNi_{1-b-c}Co_bB'_cO_{2-\alpha}F'_\alpha$ where $0.90 \leq a \leq 1.8$, $0 \leq b \leq 0.5$, $0 \leq c \leq 0.05$, and $0 < \alpha < 2$; $Li_aNi_{1-b-c}Mn_bB'_cD\alpha$ where $0.90 \leq a \leq 1.8$, $0 \leq b \leq 0.5$, $0 \leq c \leq 0.05$, and $0 < \alpha \leq 2$; $Li_aNi_{1-b-c}Mn_bB'_cO_{2-\alpha}F_\alpha$ where $0.90 \leq a \leq 1.8$, $0 \leq b \leq 0.5$, $0 \leq c \leq 0.05$, and $0 < \alpha < 2$; $Li_aNi_{1-b-c}Mn_bB'_cO_{2-\alpha}F_\alpha$ where $0.90 \leq a \leq 1.8$, $0 \leq b \leq 0.5$, $0 \leq c \leq 0.05$, and $0 < \alpha < 2$; $Li_aNi_bE_cG_dO_2$ where $0.90 \leq a \leq 1.8$, $0 \leq b \leq 0.9$, $0 \leq c \leq 0.5$, and $0.001 \leq d \leq 0.1$; $Li_aNi_bCo_cMn_dGeO_2$ where $0.90 \leq a \leq 1.8$, $0 \leq b \leq 0.9$, $0 \leq c \leq 0.5$, $0 \leq d \leq 0.5$, and $0.001 \leq e \leq 0.1$; $Li_aNiG_bO_2$ where $0.90 \leq a \leq 1.8$ and $0.001 \leq b \leq 0.1$; $Li_aCoG_bO_2$ where $0.90 \leq a \leq 1.8$ and $0.001 \leq b \leq 0.1$; $Li_aMnG_bO_2$ where $0.90 \leq a \leq 1.8$ and $0.001 \leq b \leq 0.1$; $Li_aMn_2G_bO_4$ where $0.90 \leq a \leq 1.8$ and $0.001 \leq b \leq 0.1$; $QO_2$; $QS_2$; $LiQS_2$; $V_2O_5$; $LiV_2O_5$; $LiI'O_2$; $LiNiVO_4$; $Li_{(3-f)}J_2(PO_4)_3$ where $0 \leq f \leq 2$; $Li_{(3-f)}Fe_2(PO_4)_3$ where $0 \leq f \leq 2$; and $LiFePO_4$.

In the formulae above, A is nickel (Ni), cobalt (Co), manganese (Mn), or a combination thereof; B' is aluminum (Al), Ni, Co, Mn, chromium (Cr), iron (Fe), magnesium (Mg), strontium (Sr), vanadium (V), a rare earth element, or a combination thereof; D is oxygen (O), fluorine (F), sulfur (S), phosphorous (P), or a combination thereof; E is Co, Mn, or a combination thereof; F' is F, S, P, or a combination thereof; G is Al, Cr, Mn, Fe, Mg, lanthanum (La), cerium (Ce), Sr, V, or a combination thereof; Q is titanium (Ti), molybdenum (Mo), Mn, or a combination thereof; I' is Cr, V, Fe, scandium (Sc), yttrium (Y), or a combination thereof; and J is V, Cr, Mn, Co, Ni, copper (Cu), or a combination thereof.

The compound may have a coating layer on a surface thereof or the compound may be combined with a compound having a coating layer. The coating layer may include a coating element compound of an oxide or a hydroxide of a coating element, an oxyhydroxide of a coating element, an oxycarbonate of a coating element, or a hydroxycarbonate of a coating element. The compound forming the coating layer may be amorphous or crystalline. The coating element included in the coating layer may be at least one selected from Mg, Al, Co, potassium (K), sodium (Na), calcium (Ca), Si, Ti, V, tin (Sn), germanium (Ge), gallium (Ga), boron (B), arsenic (As), and zirconium (Zr). A process of forming the coating layer may be any suitable coating method capable of coating the compound by using the elements in a manner that does not adversely affect desirable physical properties of the positive active material (e.g., spray coating or immersion), and since the details of the coating process may be determined by one of skill in the art without undue experimentation, additional detailed description of the coating process is omitted.

For example, the compound may be $LiNiO_2$, $LiCoO_2$, $LiMn_xO_{2x}$ where x is 1 or 2, $LiNi_{1-x}Mn_xO_2$ where $0<x<1$, $LiNi_{1-x-y}Co_xMn_yO_2$ where $0\leq x\leq 0.5$ and $0\leq y\leq 0.5$, $LiFeO_2$, $V_2O_5$, TiS, MoS, or the like.

In the positive active material composition, the same conductive agent, binder and solvent as those used for the negative active material composition may be used. Also, a plasticizer may be further added to the positive active material composition and/or the negative active material composition to form pores in the electrode plate.

The amounts of the positive active material, the conductive agent, the binder, and the solvent are those levels commonly used in lithium batteries. At least one of the conductive agent, the binder, and the solvent may be omitted if desired depending on use and configuration of a lithium battery.

Next, a separator to be disposed between the positive and negative electrodes is prepared. The separator may be any suitable separator commonly used in lithium batteries. The separator may have a low resistance with respect to ion transfer and an excellent electrolyte retaining ability. For example, the separator may be at least one selected from glass fibers, polyester, Teflon, polyethylene, polypropylene, and polytetrafluoroethylene (PTFE), each of which is of a non-woven or woven type. For example, a windable separator, such as polyethylene or polypropylene, may be used in a lithium ion battery, and a separator having an excellent organic electrolyte retaining ability may be used in a lithium ion polymer battery. For example, the separator may be manufactured using the method as follows.

A separator composition is prepared by mixing a polymer, a filler, and a solvent. A separator may be formed by directly coating the separator composition on an electrode and drying the coated electrode. In other embodiments, a separator may be formed by casting the separator composition on a support and drying the cast support and then laminating a separator film separated from the support on the electrode.

The polymer resin used in the preparation of the separator is not particularly limited, and any suitable material used as a binder for electrode plates may be used. For example, the polymer resin may be at least one selected from a vinylidenefluoride/hexafluoropropylene copolymer, polyvinylidenefluoride (PVDF), polyacrylonitrile, and polymethylmethacrylate.

The separator may include a ceramic composition to enhance function of the separator as a membrane. For example, the separator may be coated with an oxide or include ceramic particles.

Next, an electrolyte is prepared.

In an embodiment, the electrolyte may include i) an ionic liquid containing a fluorosulfonyl imide anion and ii) a lithium salt. For example, the lithium salt may be at least one selected from lithium salts containing a fluorosulfonyl imide anion, e.g., $Li(CF_3SO_2)_2N$, $Li(FSO_2)_2N$, $LiN(SO_2C_2F_5)(CF_3SO_2)$, $LiN(SO_2C_2F_5)_2$, and $LiPF_3(CF_2CF_3)_3$.

For example, the electrolyte may be solid. For example, the electrolyte may be a boron oxide, lithium oxynitride, or the like, but is not limited thereto, and any suitable solid electrolyte used in the art may be used. The solid electrolyte may be disposed on the negative electrode by using a method, such as sputtering.

The electrolyte may further include a non-carbonate organic solvent. The non-carbonate organic solvent may be any suitable organic solvent, including those used in the art. For example, the organic solvent may be at least one selected from benzonitrile, acetonitrile, tetrahydrofuran, 2-methyltetrahydrofuran, γ-butyrolactone, dioxolane, 4-methyldioxolane, N-dimethylformamide, N-dimethylacetamide, N-dimethylsulfoxide, dioxane, 1,2-dimethoxyethane, sulfolane, dichloroethane, chlorobenzene, nitrobenzene, diethylene glycol, and dimethyl ether.

The lithium salt may be any lithium salt used in the art. For example, the lithium salt may be at least one selected from LiSCN, $LiN(CN)_2$, $LiClO_4$, $LiBF_4$, $LiAsF_6$, $LiPF_6$, $LiCF_3SO_3$, $Li(CF_3SO_2)_2N$, $LiSbF_6$, $Li(CF_3SO_2)_3C$, $LiPF_3(CF_2CF_3)_3$, $LiPF_3(CF_3)_3$, $LiB(C_2O_4)_2$, $Li(FSO_2)_2N$, $LiN(SO_2C_2F_5)(CF_3SO_2)$, $LiN(SO_2C_2F_5)_2$, $LiPF_3(CF_2CF_3)_3$, LiCl, and LiI.

Figure 2:
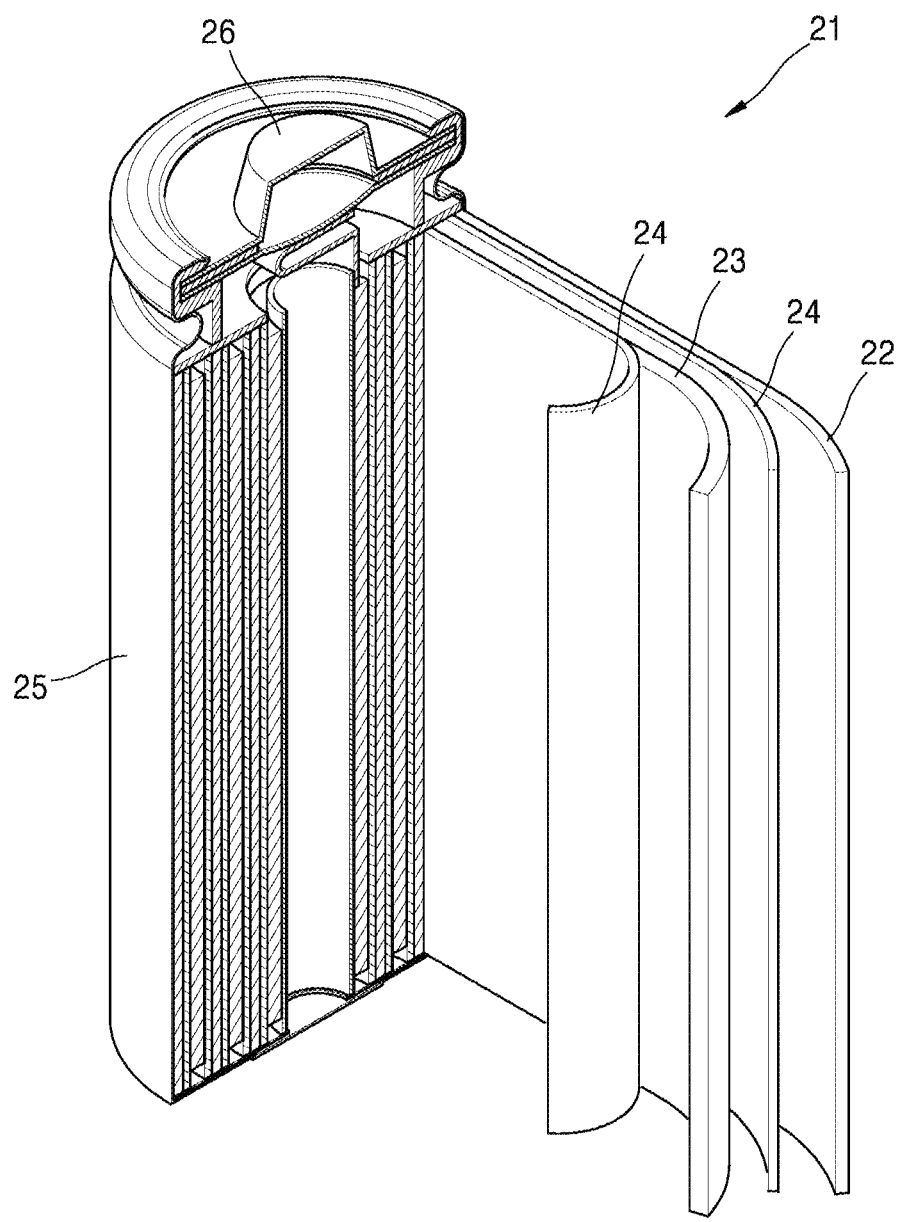
FIG. 2 is a schematic view of a lithium battery according to an exemplary embodiment.

As illustrated in FIG. 2, a lithium secondary battery 21 includes a positive electrode 23, a negative electrode 22, and a separator 24. The positive electrode 23, negative electrode 22, and separator 24 are wound or folded and accommodated in a battery case 25. Then, an organic electrolyte is injected into the battery case 25 and the battery case 25 is sealed with a cap assembly 26, thereby completing the manufacture of the lithium secondary battery 21. The battery case may have a cylindrical, rectangular or thin-film shape. For example, the lithium secondary battery may be a thin film type battery. The lithium secondary battery may be a lithium ion battery.

The separator may be disposed between the positive and negative electrodes to form a battery assembly. The battery assemblies may be stacked in a bi-cell structure and impregnated with an organic electrolyte, and the resulting structure is accommodated in a pouch and sealed therein, thereby completing the manufacture of a lithium ion polymer battery.

In addition, the battery assemblies may be stacked and form a battery pack, and the battery pack may be used in any device requiring a high capacity and a high output. For example, the battery pack may be used in laptop computers, smart phones, electric vehicles, and the like.

The lithium secondary battery has excellent charging/discharging efficiency and lifespan characteristics and thus is suitable for use in electric vehicles (EVs). For example, the lithium secondary battery is suitable for use in hybrid vehicles such as plug-in hybrid electric vehicles (PHEVs).

When the lithium secondary battery according to an embodiment is charged at 0.05 C until the voltage reaches 0.01 V and discharged at 0.05 C until the voltage reaches 1.5 V, a differential capacity peak appears at about 0.7 V.

One or more embodiments will now be described in further detail with reference to the following examples and comparative examples. However, these examples are for illustrative purposes only and are not intended to limit the scope of the embodiments.

EXAMPLES

Preparation of Composite

Preparation Example 1

Silicon nanoparticles (average particle diameter: about 150 nm) with a silicon oxide ($SiO_x$ where $0<x<2$) film (thickness: about 2 nm) disposed on a surface thereof were disposed in a reactor. A gas mixture of $CO_2$ and $CH_4$ was flowed into the reactor at a flow rate ratio of 150 standard cubic centimeters per minute (sccm):150 sccm ($CO:CH_4$) to form an atmosphere of the gas mixture inside the reactor. The pressure formed by the flow of the gas mixture inside the reactor was 1 atmosphere (atm). Under the gas mixture atmosphere, the temperature in the reactor was raised to about 1000° C. (a heating rate: about 23° C./min), and the gas mixture was continuously flowed into the reactor while the temperature was maintained for 3 hours to perform a heat treatment process. Subsequently, the product of the heat treatment was left for about 4 hours to form a graphene film on the silicon nanoparticles. Thereafter, the supply of the gas mixture was stopped, and the reactor was cooled to room temperature (25° C.) to obtain a composite including the silicon nanoparticles covered with the silicon oxide ($SiO_x$ where $0<x<2$) film and the graphene film disposed on the silicon oxide film of the silicon. The thickness of the graphene film of the composite was about 5 nm.

The amount of the graphene film in the composite was about 5 parts by weight based on 100 parts by weight of the composite.

Preparation Example 2

A composite including a graphene film laminated on silicon nanoparticles covered with a silicon oxide ($SiO_x$ where $0<x<2$) film was obtained in the same manner as in Preparation Example 1, except that a gas mixture of $CH_4$ and $N_2$ at a flow rate ratio of 30 sccm:270 sccm ($CH_4:N_2$) was used in the reactor instead of the gas mixture of $CO_2$ and $CH_4$ at a flow rate ratio of 150 sccm:150 sccm, and the thickness of the silicon oxide ($SiO_x$ where $0<x<2$) film was about 0.1 nm.

The amount of the graphene film in the composite was about 5 parts by weight based on 100 parts by weight of the composite.

Preparation Example 3

A composite including a graphene film laminated on silicon nanoparticles covered with a silicon oxide ($SiO_x$ where $0<x<2$) film was obtained in the same manner as in Preparation Example 1, except that a gas mixture of $H_2O$, $CO_2$, and $CH_4$ at a flow rate ratio of 0.001 sccm:150 sccm:150 sccm ($H_2O:CO_2:CH_4$) was used in the reactor instead of the gas mixture of $CO_2$ and $CH_4$ at a flow rate ratio of 150 sccm:150 sccm, and the thickness of the silicon oxide ($SiO_x$ where $0<x<2$) film was about 5 nm.

The amount of the graphene film in the composite was about 8 parts by weight based on 100 parts by weight of the composite. The thickness of the graphene film of the composite was about 10 nm.

Preparation Example 4

A composite including a graphene film laminated on silicon nanoparticles covered with a silicon oxide ($SiO_x$ where $0<x<2$) film was obtained in the same manner as in Preparation Example 1, except that a gas having CO at a flow rate of 100 sccm was used in the reactor instead of the gas mixture of $CO_2$ and $CH_4$ at a flow rate ratio of 150 sccm:150 sccm, and the thickness of the silicon oxide ($SiO_x$ where $0<x<2$) film was about 0.1 nm. The amount of the graphene film in the composite was about 5 parts by weight based on 100 parts by weight of the composite.

Preparation Example 5

A composite including a graphene film laminated on silicon nanoparticles covered with a silicon oxide ($SiO_x$ where $0<x<2$) film was obtained in the same manner as in Preparation Example 1, except that a gas having $CO_2$ at a flow rate of 100 sccm was used in the reactor instead of the gas mixture of $CO_2$ and $CH_4$ at a flow rate ratio of 150 sccm:150 sccm, and the thickness of the silicon oxide ($SiO_x$ where $0<x<2$) film was about 4 nm. The amount of the graphene film in the composite was about 5 parts by weight based on 100 parts by weight of the composite.

Preparation Example 6

A composite including a graphene film laminated on silicon nanoparticles covered with a silicon oxide ($SiO_x$ where $0<x<2$) film was obtained in the same manner as in Preparation Example 1, except that the internal temperature of the reactor was raised to 850° C. instead of to 1000° C. The amount of the graphene film in the composite was about 5 parts by weight based on 100 parts by weight of the composite.

Preparation Example 7

A composite including a graphene film laminated on silicon nanoparticles covered with a silicon oxide ($SiO_x$ where $0<x<2$) film was obtained in the same manner as in Preparation Example 1, except that the internal temperature of the reactor was raised to 700° C. instead of to 1000° C. The amount of the graphene film in the composite was about 5 parts by weight based on 100 parts by weight of the composite.

Preparation Example 8

A composite including silicon nanowires covered with a silicon oxide ($SiO_x$ where $0<x<2$) film and a graphene nanosheet disposed on the silicon oxide film of the silicon nanowires was obtained in the same manner as in Preparation Example 2, except that the silicon nanowires (cross-sectional diameter: 50 nm, length: 400 nm) with the silicon oxide ($SiO_x$ where $0<x<2$) film (thickness: about 0.1 nm) disposed on a surface thereof was used instead of the silicon nanoparticles (average particle diameter: about 150 nm) with the silicon oxide ($SiO_x$ where $0<x<2$) film (thickness: about 0.1 nm) disposed on a surface thereof.

The amount of the graphene nanosheet in the composite was about 5 parts by weight based on 100 parts by weight of the composite.

Preparation Example 9

A composite including a graphene film laminated on silicon nanowires covered with a silicon oxide ($SiO_x$ where $0<x<2$) film was obtained in the same manner as in Preparation Example 8, except that a gas mixture of $CH_4$ and $N_2$ at a flow rate ratio of 150 sccm:150 sccm was used in the reactor instead of the gas mixture of $CO_2$ and $CH_4$ at a flow rate ratio of 30 sccm:270 sccm.

The amount of the graphene film in the composite was about 5 parts by weight based on 100 parts by weight of the composite.

Preparation Examples 10 and 11

Composites, each of which included a graphene film disposed on silicon nanowires covered with a silicon oxide ($SiO_x$ where $0<x<2$) film, were prepared in the same manner as in Preparation Example 3, except that the amounts of the graphene films were about 0.001 parts by weight and about 90 parts by weight, respectively based on 100 parts by weight of the composite.

Comparative Preparation Example 1

A mixture of silicon nanoparticles (average particle diameter: about 150 nm) with a silicon oxide ($SiO_x$) film formed thereon, which is a natural oxide film, and Super P carbon black in a weight ratio of 95:5 was used.

Comparative Preparation Example 2

Silicon nanoparticles (VD vision/Japan (hereinafter, referred to as "Si NP"); average particle diameter: about 150 nm) with a silicon oxide ($SiO_x$) film, which is a natural oxide film, were subjected to carbonization using citric acid to form an amorphous carbon film on a surface of the silicon nanoparticles, thereby completing preparation of silicon nanoparticles (Ac—Si) with an amorphous carbon film disposed on the surface thereof.

Comparative Preparation Example 3

Silicon nanoparticles (VD vision/Japan ("Si NP"); average particle diameter: about 150 nm) with a silicon oxide ($SiO_x$) film, which is a natural oxide film, were used.

Comparative Preparation Example 4

Silicon nanoparticles (VD vision/Japan) with a silicon oxide ($SiO_x$) film, which is a natural oxide film, and graphene were mixed in a slurry mixer by mechanical mixing for 30 minutes to obtain a mixture of the silicon nanoparticles with a silicon oxide film and the graphene. Here, the silicon nanoparticles and the graphene were mixed in a mixed weight ratio of 95:5.

Manufacture of Lithium Secondary Battery (Coin Cell)

Example 1

A slurry was prepared by mixing the composite prepared according to Preparation Example 1 and a lithium-substituted polyacrylate (Li-PAA) solution. In the slurry, a mixing ratio of the composite of Preparation Example 1 to solids in the Li-PAA solution was 80:20 on a weight ratio basis.

The slurry was coated on a Cu foil by using a doctor blade to form a film having a thickness of 20 μm. The film was vacuum dried at a temperature of 120° C. for 2 hours, and then the dried product was pressed to prepare a negative electrode.

The negative electrode manufactured according to Example 1 and Li metal as a counter electrode were used to manufacture a coin cell (CR2032).

A polypropylene film (Celgard 3510) was used as a separator, and a mixture prepared by mixing lithium fluorosulfonyl imide (LiFSI) and N-propyl-N-methylpyrrolidinium bis(fluorosulfonyl)imide (Pyr13FSI) was used as an electrolyte. In this regard, the amount of LiFSI was 1.1 M and the amount of Pyr13FSI was 87 parts by weight based on 100 parts by weight of the electrolyte.

Example 2

A lithium secondary battery (coin cell) was manufactured in the same manner as in Example 1, except that LiTFSI was used instead of LiFSI in the preparation of the electrolyte.

Example 3

A lithium secondary battery (coin cell) was manufactured in the same manner as in Example 1, except that $LiPF_6$ was used instead of LiFSI in the preparation of the electrolyte.

Example 4

A lithium secondary battery (coin cell) was manufactured in the same manner as in Example 1, except that $LiBF_6$ was used instead of LiFSI in the preparation of the electrolyte.

Example 5

A lithium secondary battery was manufactured in the same manner as in Example 1, except that 1-ethyl-3-methylimidazolium bis(fluorosulfonyl)imide (EMIFSI) was used instead of Pyr13FSI in the preparation of the electrolyte.

Example 6

A lithium secondary battery (coin cell) was manufactured in the same manner as in Example 5, except that LiTFSI was used instead of LiFSI in the preparation of the electrolyte.

Example 7

A lithium secondary battery (coin cell) was manufactured in the same manner as in Example 1, except that $LiPF_6$ was used instead of LiFSI in the preparation of the electrolyte.

Example 8

A lithium secondary battery was manufactured in the same manner as in Example 1, except that 1-ethyl-3-methylimidazolium tri(fluorosulfonyl)imide (EMITFSI) was used instead of Pyr13FSI in the preparation of the electrolyte.

Example 9

A lithium secondary battery (coin cell) was manufactured in the same manner as in Example 8, except that LiTFSI was used instead of LiFSI in the preparation of the electrolyte.

Examples 10 to 17

Lithium secondary batteries (coin cells) were manufactured in the same manner as in Example 1, except that the respective composites of Preparation Examples 2 to 9 were used instead of the composite of Preparation Example 1.

Example 18

A slurry was prepared by mixing the composite of Preparation Example 1 and a lithium-substituted polyacrylate (Li-PAA) solution. In the slurry, a mixing ratio of the composite of Preparation Example 1 to solids in the Li-PAA solution was 80:20 on a weight ratio basis.

The slurry was coated on a Cu foil by using a doctor blade to form a film having a thickness of 20 μm. The film was vacuum dried at a temperature of 120° C. for 2 hours, and then the dried product was pressed to prepare a negative electrode.

The negative electrode of Example 1 and Li metal as a counter electrode were cut to a size of 1.2 cm×5.0 cm, the negative electrode and the Li metal were stacked with a separator intervening therebetween, pouches (aluminum/polypropylene) for preventing the permeation of moisture were positioned on opposite surfaces of the electrodes, an electrolyte is injected into the resulting structure, and then the pouches were sealed by thermal bonding, thereby completing the manufacture of a pouch cell.

A polypropylene film (Celgard 3510) was used as a separator, and a mixture prepared by mixing LiFSI and Pyr13FSI was used as an electrolyte. In this regard, the amount of LiFSI was 1.0 M. The amount of Pyr13FSI was 87 parts by weight based on 100 parts by weight of the electrolyte.

Example 19

A pouch cell was manufactured in the same manner as in Example 18, except that the amount of LiFSI used was 1.5 M.

Examples 20 and 21

Lithium secondary batteries (coin cells) were manufactured in the same manner as in Example 1, except that the amounts of Pyr13FSI were 1 part by weight and 95 parts by weight, respectively, based on 100 parts by weight of the electrolyte.

Examples 22 and 23

Lithium secondary batteries were manufactured in the same manner as in Example 1, except that the composite of Preparation Example 10 and the composite of Preparation Example 11 were used instead of the composite of Preparation Example 1.

Comparative Example 1

A lithium secondary battery (coin cell) was manufactured in the same manner as in Example 1, except that a 1.1 M $LiPF_6$ solution prepared by mixing diethylene carbonate (DEC), fluoroethylene carbonate (FEC), and $LiPF_6$ was used as an electrolyte.

Comparative Example 2

A lithium secondary battery (coin cell) was manufactured in the same manner as in Comparative Example 1, except that LiFSI was used instead of $LiPF_6$ in the preparation of the electrolyte.

Comparative Example 3

A lithium secondary battery (coin cell) was manufactured in the same manner as in Comparative Example 1, except that LiTFSI was used instead of $LiPF_6$ in the preparation of the electrolyte.

Comparative Example 4

A lithium secondary battery (coin cell) was manufactured in the same manner as in Example 1, except that the mixture prepared according to Comparative Preparation Example 1 was used instead of the composite of Preparation Example 1.

Comparative Example 5

A lithium secondary battery (coin cell) was manufactured in the same manner as in Example 1, except that the mixture of Comparative Preparation Example 1 was used instead of the composite of Preparation Example 1, and a 1.1 M $LiPF_6$ solution prepared by mixing DEC, FEC, and $LiPF_6$ was used as an electrolyte. In this regard, a mixing ratio of DEC and FEC was 6:4 on a volume ratio basis.

Comparative Example 6

A lithium secondary battery (coin cell) was manufactured in the same manner as in Example 1, except that the Ac—Si prepared according to Comparative Preparation Example 2 was used instead of the composite of Preparation Example 1.

Comparative Example 7

A lithium secondary battery (coin cell) was manufactured in the same manner as in Example 1, except that the Ac—Si of Comparative Preparation Example 2 was used instead of the composite of Preparation Example 1, and a 1.1 M $LiPF_6$ solution prepared by mixing DEC, FEC, and $LiPF_6$ was used as an electrolyte. In this regard, a mixing ratio of DEC and FEC was 6:4 on a volume ratio basis.

Comparative Example 8

A lithium secondary battery (coin cell) was manufactured in the same manner as in Example 1, except that the Si NP prepared according to Comparative Preparation Example 3 was used instead of the composite of Preparation Example 1.

Comparative Example 9

A lithium secondary battery (coin cell) was manufactured in the same manner as in Example 1, except that the Si NP of Comparative Preparation Example 3 was used instead of the composite of Preparation Example 1, and a 1.1 M $LiPF_6$ solution prepared by mixing DEC, FEC, and $LiPF_6$ was used as an electrolyte. In this regard, a mixing ratio of DEC and FEC was 6:4 on a volume ratio basis.

Comparative Example 10

A lithium secondary battery (coin cell) was manufactured in the same manner as in Example 1, except that the mixture prepared according to Comparative Preparation Example 4 was used instead of the composite of Preparation Example 1.

Comparative Example 11: Manufacture of Pouch Cell

A pouch cell was manufactured in the same manner as in Comparative Example 1, except that the amount of the $LiPF_6$ solution in an electrolyte was about 1.0 M and the pouch cell was manufactured using the method described below.

The negative electrode manufactured according to Comparative Example 1 and Li metal as a counter electrode were cut to a size of 1.2 cm×5.0 cm, the negative electrode and the Li metal were stacked with a separator intervening therebetween, pouches (aluminum/polypropylene) for preventing the permeation of moisture were positioned on opposite surfaces of the electrodes, an electrolyte is injected into the resulting structure, and then the pouches were sealed by thermal bonding, thereby completing the manufacture of a pouch cell.

A polypropylene film (Celgard 3510) was used as a separator, and a 1.0 M $LiPF_6$ solution prepared by mixing DEC, FEC, and LiPF$_6$ was used as an electrolyte. In this regard, the mixing ratio of DEC and FEC was 6:4 on a volume ratio basis.

Comparative Example 12

A pouch cell was manufactured in the same manner as in Comparative Example 11, except that the amount of the LiPF$_6$ solution in the electrolyte was about 1.5 M.

Evaluation Example 1: Charge/Discharge Characteristics

1) Example 1 and Comparative Examples 1 and 4 to 7

Charge/discharge characteristics of the coin cells manufactured according to Example 1 and Comparative Examples 1 and 4 to 7 were evaluated using a charger/discharger (manufactured by TOYO, model: TOYO-3100).

First, in the 1$^{st}$ cycle (n=1), each coin cell was charged at a C-rate of 0.05 C (unit: milliAmpere/gram (mA/g), 1 C=2500 mA/g) at room temperature (25° C.) until the voltage reached 0.01 V and then discharged at a C-rate of 0.05 C until the voltage reached 1.5 V, thereby completing a precycling process.

Subsequently, in the 1$^{st}$ cycle (n=1), each coin cell was charged at a C-rate of 0.2 C (unit: mA/g) at room temperature (25° C.) until the voltage reached 0.01 V and then discharged at a C-rate of 0.2 C until the voltage reached 1.5 V. Thereafter, each coin cell was rested for 10 minutes. Subsequently, in the 2$^{nd}$ or more cycles (n≥2), each coin cell was charged at a C-rate of 0.2 C at room temperature (25° C.) until the voltage reached 0.01 V and then discharged at a C-rate of 0.2 C until the voltage reached 1.0 V. This cycle of charging and discharging processes was repeated 200 times (i.e., n=200).

Figure 3:
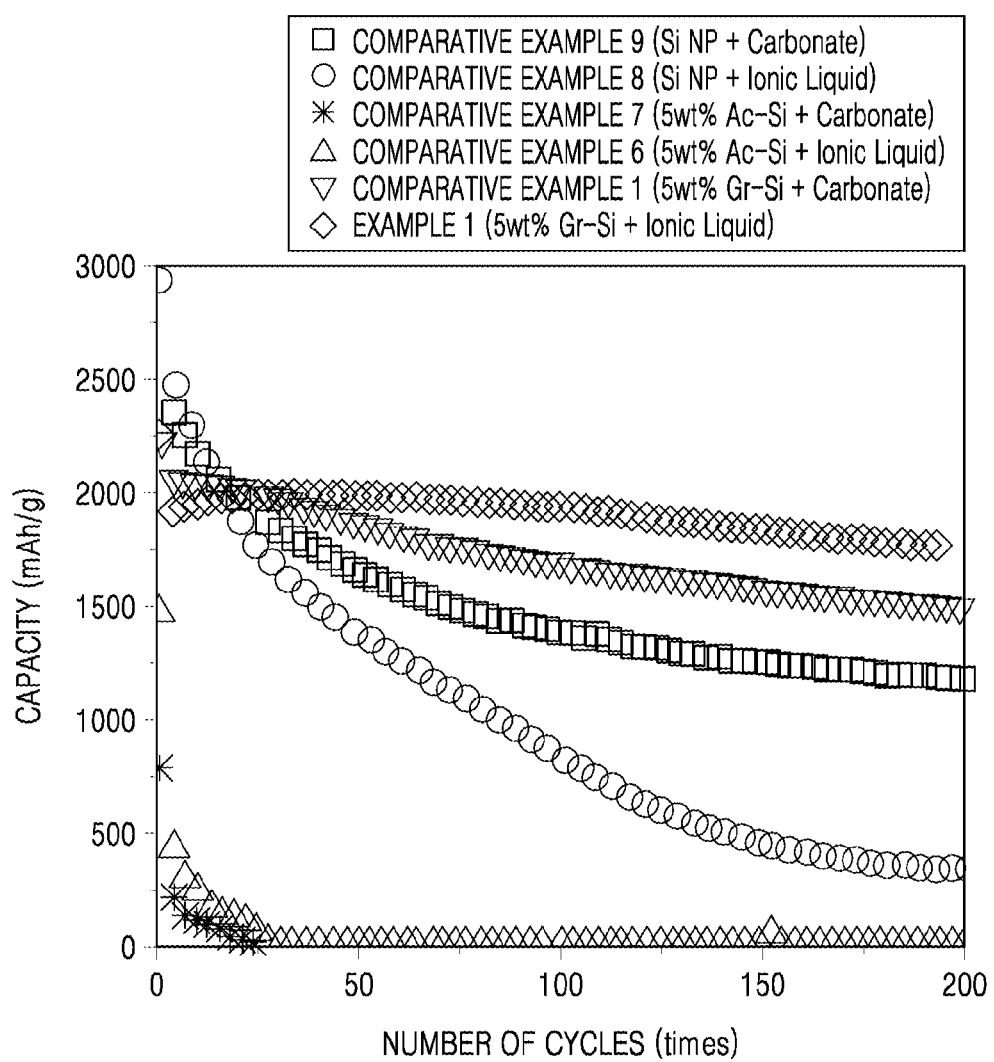
FIG. 3 is a graph of capacity versus cycle number, showing changes in capacity retention of coin cells manufactured according to Example 1 and Comparative Examples 1 and 6 to 9.
Figure 4:
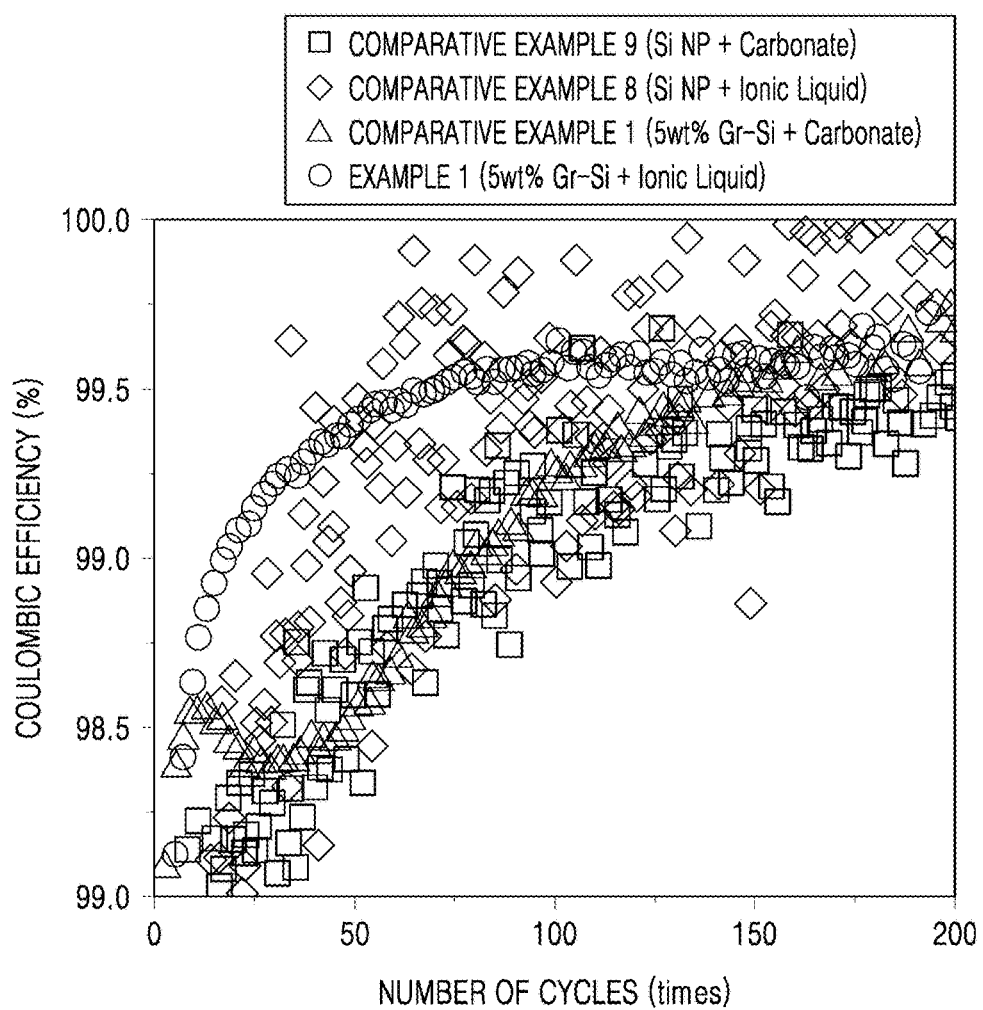
FIG. 4 is a graph of coulombic efficiency (%) versus charge/discharge cycle number, showing changes in Coulombic efficiency of coin cells manufactured according to Example 1 and Comparative Examples 5, 8 and 9.

A part of the charge/discharge characteristics evaluation results was calculated according to Equations 1 to 4 below and shown in Table 2 below and FIGS. 3 and 4:

Initial efficiency (%)=(discharge capacity in 1$^{st}$ cycle/charge capacity in 1$^{st}$ cycle)×100%   Equation 1

Charge/discharge efficiency (50$^{th}$)(%)=(discharge capacity in 50$^{th}$ cycle/charge capacity in 50$^{th}$ cycle)×100%   Equation 2

Capacity retention (%)=(discharge capacity in 200$^{th}$ cycle/discharge capacity in 1$^{st}$ cycle)×100%   Equation 3

Average charge/discharge efficiency (%)=an average of charge/discharge efficiencies of 1$^{st}$ to 200$^{th}$ cycles.   Equation 4

TABLE 2

|  | Initial efficiency (%) | Charge/ discharge efficiency (%) | Average charge/ discharge efficiency (%) | Capacity retention (%) |
| --- | --- | --- | --- | --- |
| Example 1 | 86.5 | 99.47 | 99.42 | 92.6 (1815/1958)* |
| Comparative Example 1 | 82.9 | 98.52 | 99.11 | 72.3 (1560/2150)* |
| Comparative Example 4 | 76.6 | 99.10 (unstable) | 99.29 | 12.9 (338/2623)* |
| Comparative Example 5 | 81.1 | 98.58 (unstable) | 98.98 | 47.8 (338/2623)* |

TABLE 2-continued

|  | Initial efficiency (%) | Charge/ discharge efficiency (%) | Average charge/ discharge efficiency (%) | Capacity retention (%) |
| --- | --- | --- | --- | --- |
| Comparative Example 6 | 37.4 | — | — | ~0 |
| Comparative Example 7 | 26.3 | — | — | ~0 |

*(Discharge capacity for cycle 200/discharge capacity for cycle 1).

Referring to Table 2, it is confirmed that the lithium secondary battery of Example 1 exhibited enhanced initial efficiency, charge/discharge efficiency, average charge/discharge efficiency and capacity retention, as compared to those of the lithium secondary batteries of Comparative Examples 1 and 4 to 7. As shown in Table 2, the lithium secondary batteries of Comparative Examples 4 and 5 exhibit an unstable charge/discharge efficiency, which indicates that an incomplete protective film is formed.

In addition, initial efficiency, charge/discharge efficiency, average charge/discharge efficiency, and capacity retention of the coin cells manufactured according to Examples 20 and 21 were evaluated.

As a result of evaluation, the initial efficiency, charge/discharge efficiency, average charge/discharge efficiency, and capacity retention of the coin cells of Examples 20 and 21 were similar to those of the lithium secondary battery of Example 1.

Evaluation Example 2: Differential Capacity (dQ/dV) Profile

Differential capacity profiles of the lithium secondary batteries manufactured according to Example 1 and Comparative Examples 1 and 6 to 9 were evaluated. The first cycle of charging and discharging processes was performed and differential charging/discharging (dQ/dV) profiles were evaluated in the first lithiation reaction. In this regard, a precycling process was performed according to the following processes.

First, in the 1$^{st}$ cycle (n=1), each coin cell was charged at a C-rate of 0.05 C (unit: mA/g, 1 C=2500 mA/g) at room temperature (25° C.) until the voltage reached 0.01 V and then discharged at a C-rate of 0.05 C until the voltage reached 1.5 V, thereby completing the precycling process.

Subsequently, in the 1$^{st}$ cycle (n=1), each coin cell was charged at a C-rate of 0.2 C (unit: mA/g) at room temperature (25° C.) until the voltage reached 0.01 V and then discharged at a C-rate of 0.2 C until the voltage reached 1.5 V. Thereafter, each coin cell was rested for 10 minutes. Subsequently, in the 2$^{nd}$ or more cycles (n≥2), each coin cell was charged at a C-rate of 0.2 C at room temperature (25° C.) until the voltage reached 0.01 V and then discharged at a C-rate of 0.2 C until the voltage reached 1.0 V.

Figure 5:
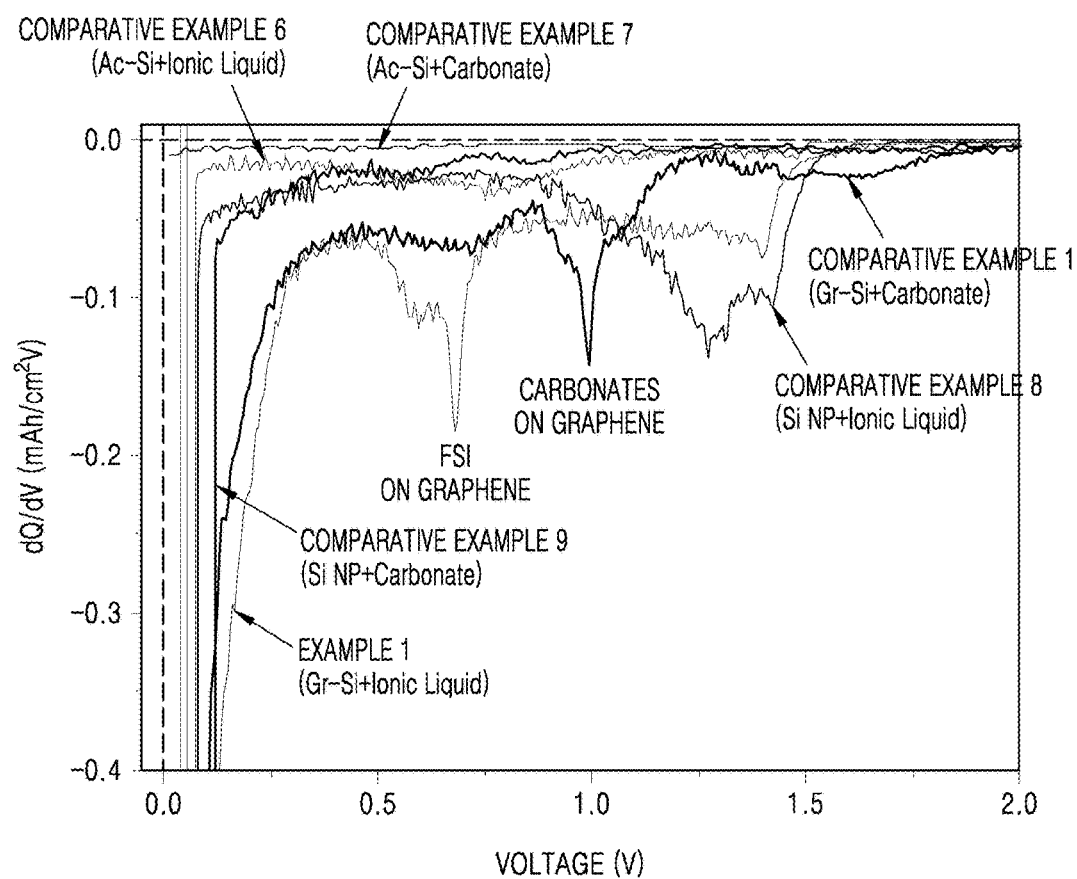
FIG. 5 is a graph of $1^{st}$ cycle differential capacity (dQ/dV) versus voltage of the coin cells of Example 1 and Comparative Examples 1 and 6 to 9.

FIG. 5 illustrates differential capacity profiles of the precycling process.

Referring to FIG. 5, the lithium secondary battery of Example 1 exhibited a peak at about 0.7 V. From the result, it is confirmed that, in the first lithiation process, a stable protective film (SEI film) was formed at a surface of graphene by the decomposition of an ionic electrolyte.

By contrast, the lithium secondary battery of Comparative Example 1 exhibited a peak at around 1.0 V, from which it is confirmed that a protective film was formed at a surface of the graphene coating film by the decomposition of the electrolyte. In the lithium secondary batteries of Comparative Examples 6 to 9, no protective film was formed in the first lithiation process.

Figure 6:
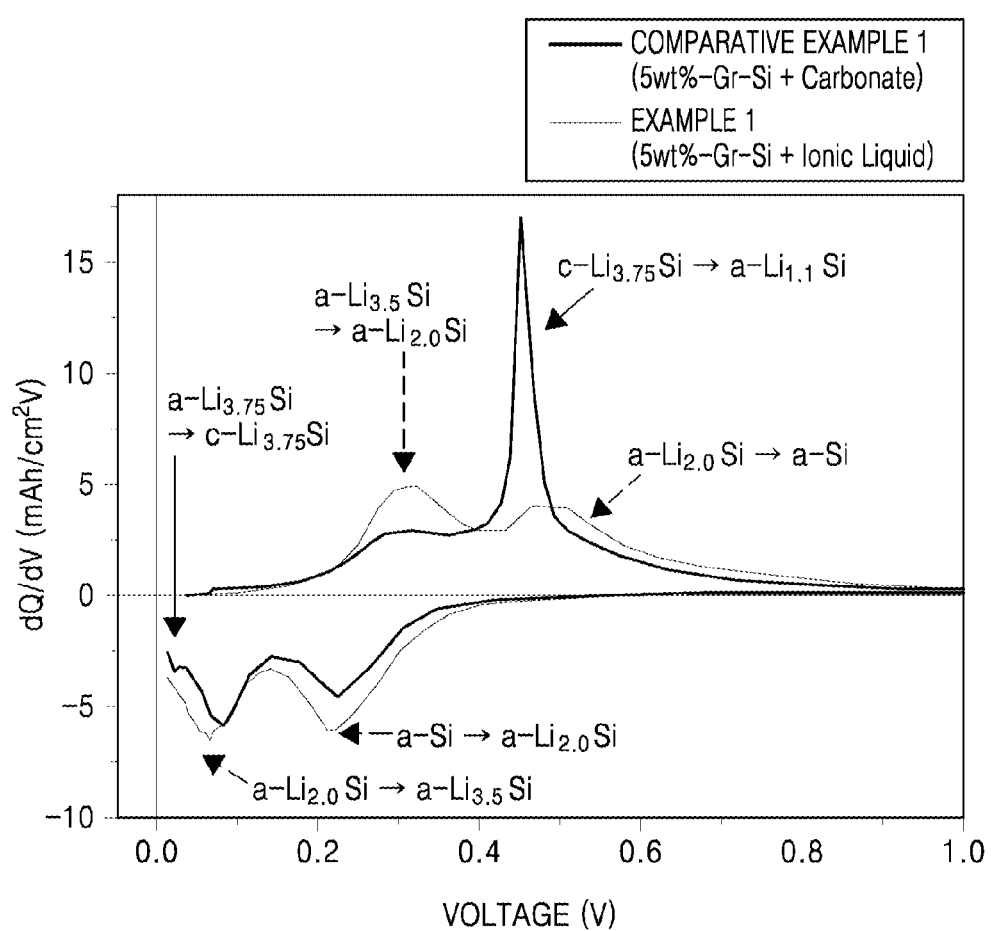
FIG. 6 is a graph of $2^{nd}$ cycle differential capacity (dQ/dV) versus voltage of the lithium secondary batteries of Example 1 and Comparative Example 1.

In addition, the second cycle of charging and discharging processes was performed on the lithium secondary batteries of Example 1 and Comparative Example 1 and differential charging/discharging (dQ/dV) profiles were evaluated thereon. The evaluation results are shown in FIG. 6. In this regard, each lithium secondary battery was charged at 0.2 C up to 0.01 V and discharged at 0.2 C up to 1.0 V.

FIG. 6 illustrates differential capacity profiles of the second cycle (n=2).

Referring to FIG. 6, the lithium secondary battery of Example 1 used a different electrolyte from that of the lithium secondary battery of Comparative Example 1, and included a protective film. Thus overcharging was prevented in the lithium secondary battery of Example 1, thus suppressing the irreversible generation of crystalline $Li_xSi$ (e.g., $c-Li_{3.75}Si$). The lithium secondary battery of Comparative Example 1 included, as illustrated in FIG. 5, a protective film at a surface of the graphene coating film by the decomposition of the electrolyte, but did not exhibit an overcharging prevention effect.

Evaluation Example 3: X-Ray Photoelectron Spectroscopy (XPS) Analysis

Charging and discharging processes of each of the lithium secondary batteries of Example 1 and Comparative Example 1 were performed using a Quantum 2000 instrument (Physical Electronics) and then an X-ray photoelectron spectroscopy (XPS) test was performed on each lithium secondary battery.

Each coin cell was charged at a C-rate of 0.05 C (unit: mA/g, 1 C=2500 mA/g) at room temperature (25° C.) until the voltage reached 0.01 V and then discharged at a C-rate of 0.05 C until the voltage reached 1.5 V, thereby completing a precycling process.

Subsequently, in the $1^{st}$ cycle (n=1), each coin cell was charged at a C-rate of 0.2 C (unit: mA/g) at room temperature (25° C.) until the voltage reached 0.01 V and then discharged at a C-rate of 0.2 C until the voltage reached 1.5 V. Thereafter, each coin cell was rested for 10 minutes. Subsequently, in the $2^{nd}$ or more cycles (n≥2), each coin cell was charged at a C-rate of 1 C at room temperature (25° C.) until the voltage reached 0.01 V and then discharged at a C-rate of 0.2 C until the voltage reached 1.0 V. This cycle of charging and discharging processes was repeated 200 times (i.e., n=200).

Figure 7A:
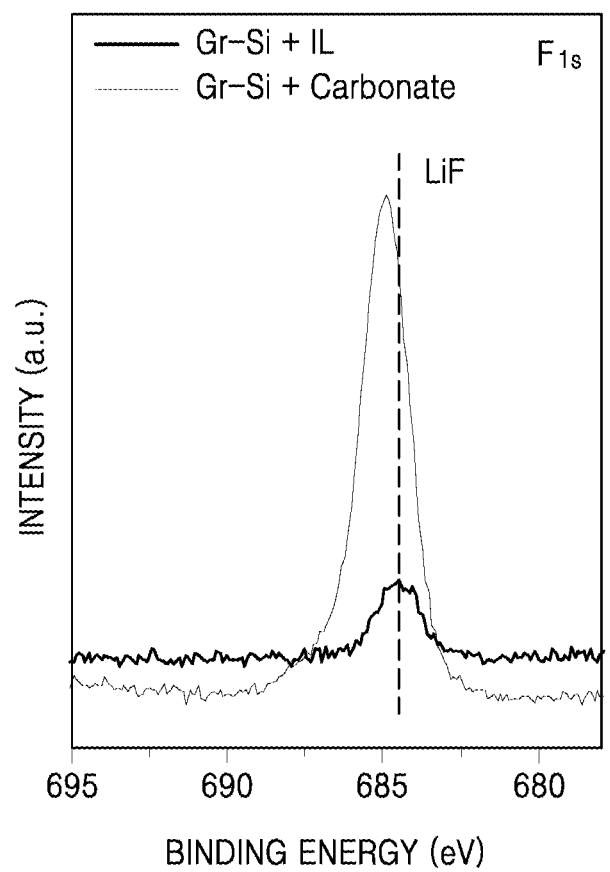
FIGS. 7A to 7C are graphs of intensity (arbitrary units, a.u.) versus binding energy (eV) determined by X-ray photoelectron spectroscopy (XPS) for the lithium secondary batteries of Example 1 and Comparative Example 1.
Figure 7B:
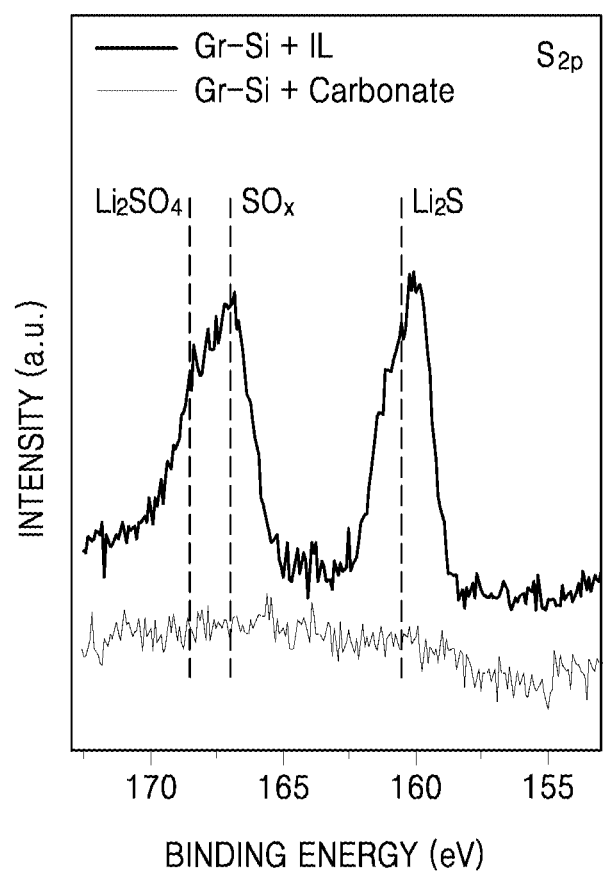
Figure 7C:
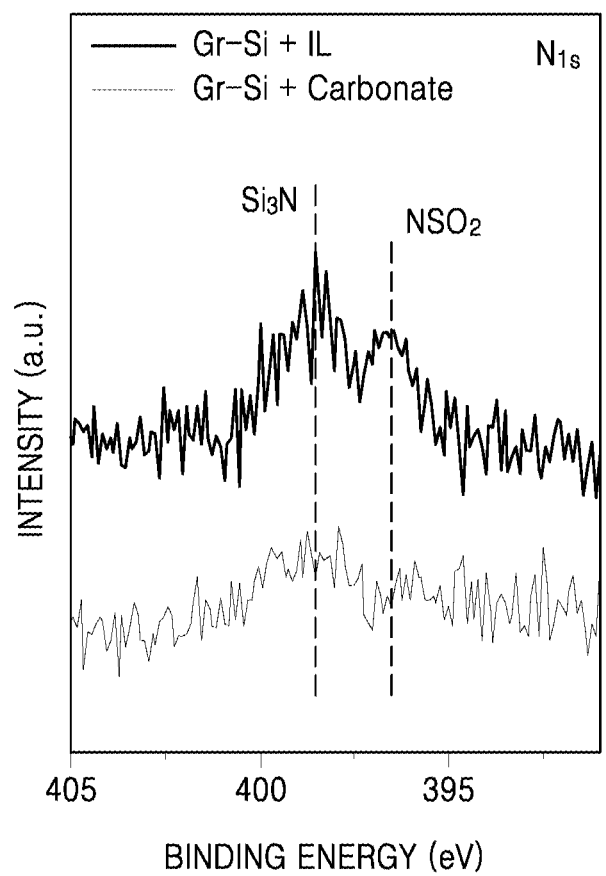

The XPS test results are shown in FIGS. 7A to 7C. FIG. 7A illustrates an $F_{1s}$ spectrum, FIG. 7B illustrates an $S_{2p}$ spectrum, and FIG. 7C illustrates an $N_{1s}$ spectrum.

The XPS analysis was performed using a Quantum 200 instrument (available from Physical Electronics Inc.) at an acceleration voltage of 0.5 kilo electron volt (keV) to 15 keV, 300 Watt (W), an energy resolution at about 1.0 electron volt (eV), a minimum analysis area of 10 micrometers, and a sputter rate of 0.1 nm/min.

From the results shown in FIGS. 7A to 7C, it is confirmed that the protective film of the negative electrode of the lithium secondary battery of Example 1 included sulfur (S), fluorine (F), and nitrogen (N).

Evaluation Example 4: Voltage Profile

Voltage profiles of the coin cells of Example 1 and Comparative Example 1 in the $2^{nd}$ and $100^{th}$ cycles were evaluated.

First, in the $1^{st}$ cycle (n=1), each coin cell was charged at a C-rate of 0.05 C (unit: mA/g, 1 C=2500 mA/g) at room temperature (25° C.) until the voltage reached 0.01 V and then discharged at a C-rate of 0.05 C until the voltage reached 1.5 V, thereby completing a precycling process.

Subsequently, in the $1^{st}$ cycle (n=1), each coin cell was charged at a C-rate of 0.2 C (unit: mA/g) at room temperature (25° C.) until the voltage reached 0.01 V and then discharged at a C-rate of 0.2 C until the voltage reached 1.5 V. Thereafter, each coin cell was rested for 10 minutes. Subsequently, in the $2^{nd}$ or more cycles (n≥2), each coin cell was charged at a C-rate of 0.2 C at room temperature (25° C.) until the voltage reached 0.01 V and then discharged at a C-rate of 0.2 C until the voltage reached 1.0 V. This cycle of charging and discharging processes was repeated 100 times (i.e., n=100).

Figure 8A:
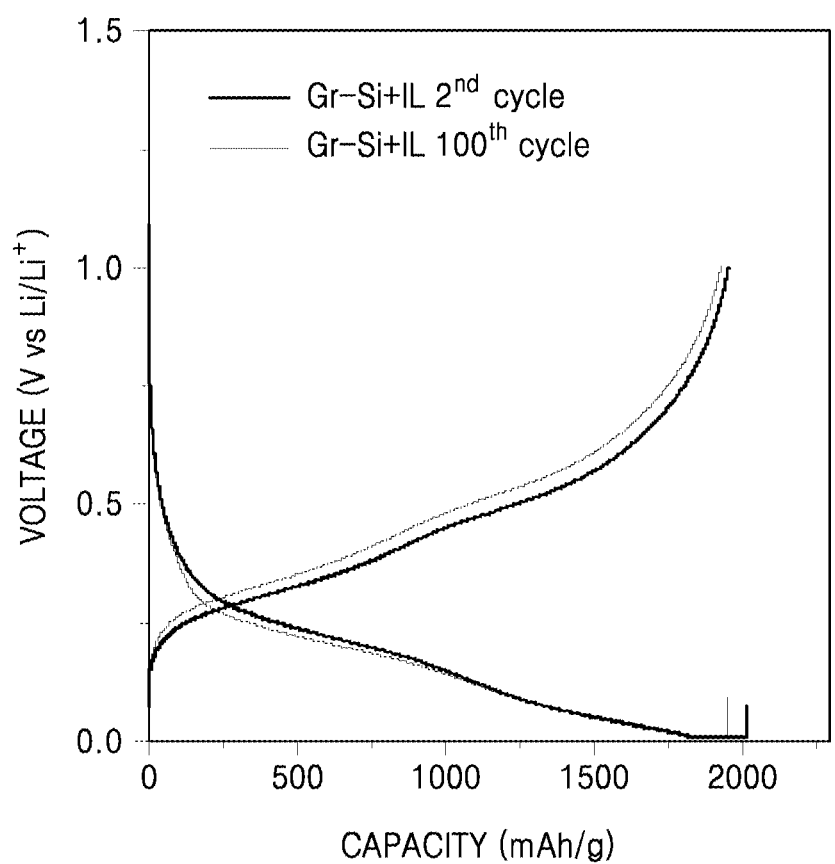
FIG. 8A is a graph showing voltage versus capacity for the $2^{nd}$ and $100^{th}$ cycles of the coin cell of Example 1.
Figure 8B:
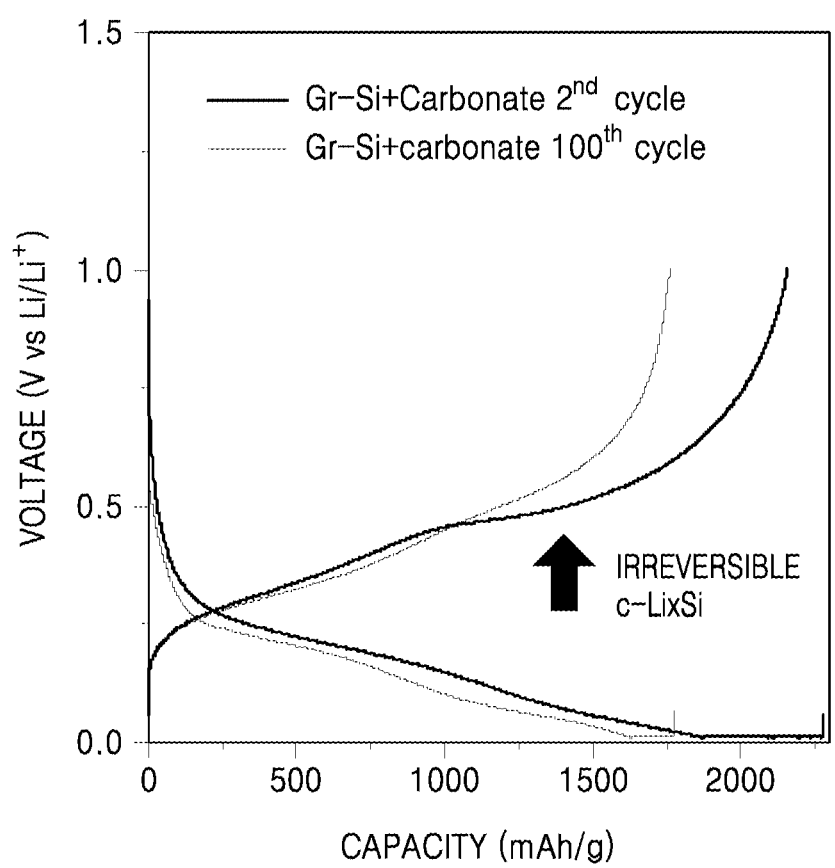
FIG. 8B is a graph showing voltage versus capacity for the $2^{nd}$ and $100^{th}$ cycles of the coin cell of Comparative Example 1.

After the charging and discharging processes, voltage profiles of the coin cells of Example 1 and Comparative Example 1 were evaluated, and the results thereof are shown in FIGS. 8A and 8B.

Referring to FIG. 8A, it is confirmed that the lithium secondary battery of Example 1 exhibited a stable charging/discharging behavior in the $2^{nd}$ and $100^{th}$ cycles without a rapid decrease in capacity and exhibited a small change in voltage according to an electrochemical reaction.

By contrast, referring to FIG. 8B, it is confirmed that the coin cell of Comparative Example 1 exhibited a decrease in capacity as the number of cycles of charging and discharging processes increased and exhibited a large change in voltage according to an electrochemical reaction.

Evaluation Example 5: Charging/Discharging Characteristics (Capacity Retention and Charging/Discharging Efficiency)

1) Examples 1 to 4 and Comparative Examples 1 to 4

Charging/discharging characteristics of the coin cells of Examples 1 to 4 and Comparative Examples 1 to 4 were evaluated as follows.

In the $1^{st}$ cycle (n=1), each coin cell was charged at a C-rate of 1 C (unit: mA/g) at room temperature (25° C.) until the voltage reached 0.01 V and then discharged at a C-rate of 0.05 C until the voltage reached 1.0 V, thereby completing a formation process.

Subsequently, in the $1^{st}$ cycle (n=1), each coin cell was charged at a C-rate of 0.2 C (unit: mA/g) at room temperature (25° C.) until the voltage reached 0.01 V and then discharged at a C-rate of 0.2 C until the voltage reached 1.0 V. Thereafter, each coin cell was rested for 10 minutes. Subsequently, in the $2^{nd}$ or more cycles (n≥2), each coin cell was charged at a C-rate of 1 C at room temperature (25° C.) until the voltage reached 0.01 V and then discharged at a C-rate of 0.2 C until the voltage reached 1.5 V. This cycle of charging and discharging processes was repeated 100 times (i.e., n=100).

Figure 9:
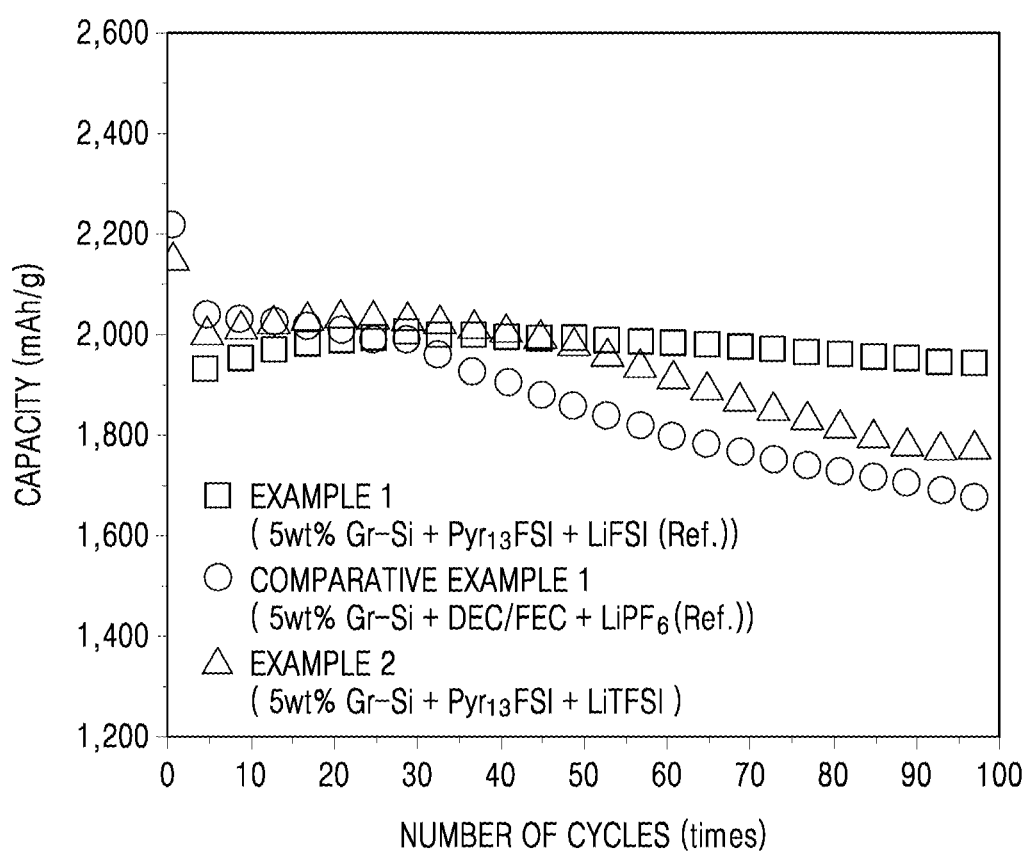
FIG. 9 is a graph of capacity versus cycle number, showing changes in capacity retention of coin cells manufactured according to Examples 1 and 2 and the coin cell of Comparative Example 1.
Figure 10:
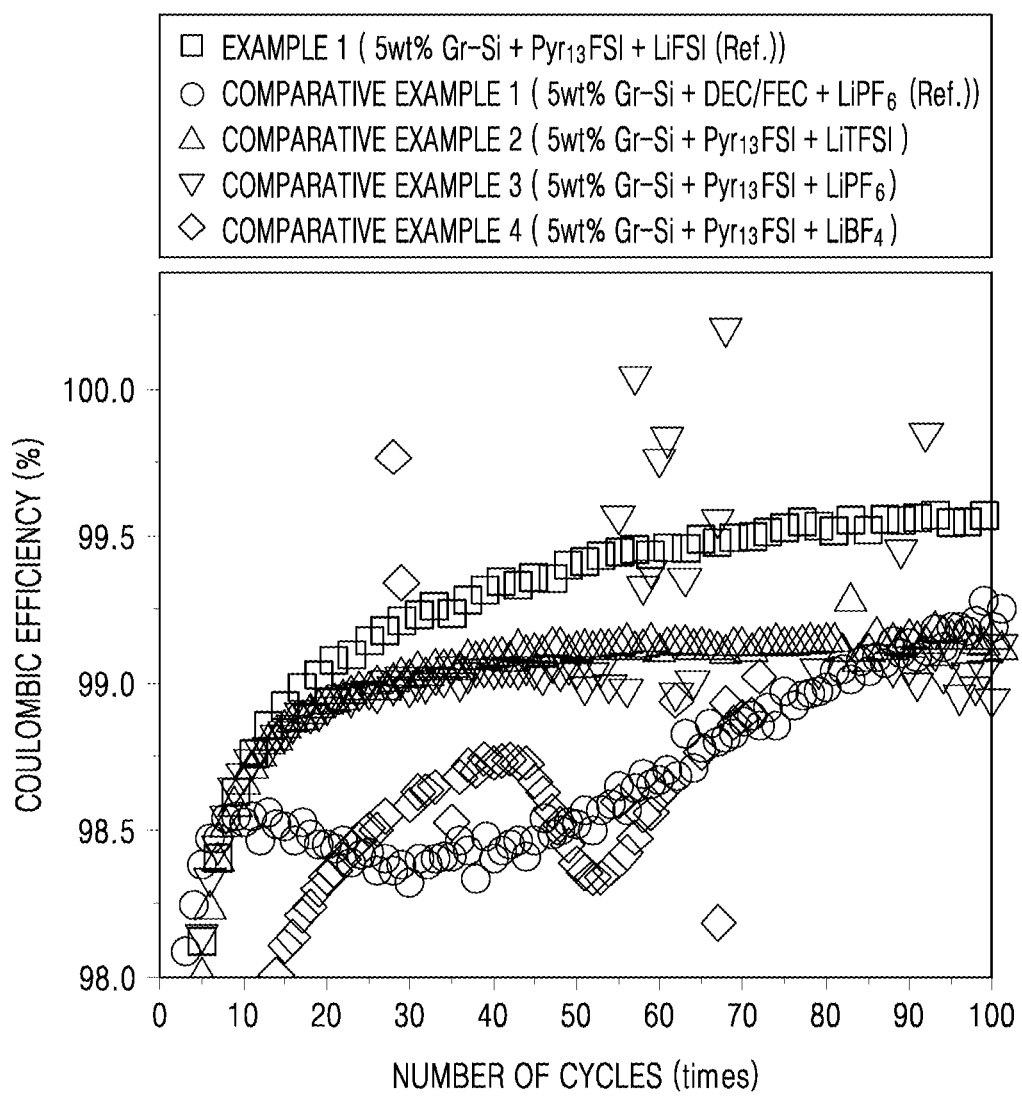
FIG. 10 is a graph showing Coulombic efficiency a versus cycle number for coin cells manufactured according to Examples 1 to 4 and Comparative Examples 1 to 4.

Among the charging/discharging evaluation results, changes in capacity of the coin cells of Example 1 and Comparative Examples 1 and 2 are shown in FIG. 9, and changes in Coulombic efficiency of the coin cells of Example 1 and Comparative Examples 1 to 4 are shown in FIG. 10. This experiment was conducted for evaluating changes in capacity retention and charging/discharging efficiency of a battery according to the kind of lithium salt.

Referring to FIG. 9, the coin cell of Example 1 were found to exhibit improved charging and discharging efficiency and capacity retention, as compared with those of Comparative Examples 1 and 2. Furthermore, referring to FIG. 10, it was found that the coin cell of Example 1 using LiFSI as the lithium salt exhibited improved charging and discharging efficiency and capacity retention ratio, as compared with those of the coin cells of Comparative Examples 1 to 4. Although it is not shown in FIG. 10, the coin cells of Examples 2 to 4, each using LiTFSI, $LiPF_6$, and $LiBF_4$ as a lithium salt, respectively, also exhibited charging and discharging efficiency at the similar level to that of the coin cell of Example 1.

2) Examples 22 and 23

Charging/discharging efficiency and capacity retention of the coin cells of Examples 22 and 23 were evaluated in the same manner as the evaluation method of charging/discharging characteristics of the coin cells of Examples 1 to 4 and Comparative Examples 1 to 4.

As a result of the evaluation, initial efficiency, charging/discharging efficiency, average charging/discharging efficiency, and capacity retention of the coin cells of Examples 22 and 23 were similar to those of the coin cell of Example 1.

3) Examples 1, 5, 6 and 8 and Comparative Example 2

Charging/discharging characteristics of the coin cells manufactured according to Example 1, 5, 6 and 8 and Comparative Example 2 were evaluated using the same method as that used to evaluate the charging/discharging characteristics of the coin cells of Examples 1 to 4 and Comparative Examples 1 to 4 described above.

Figure 11:
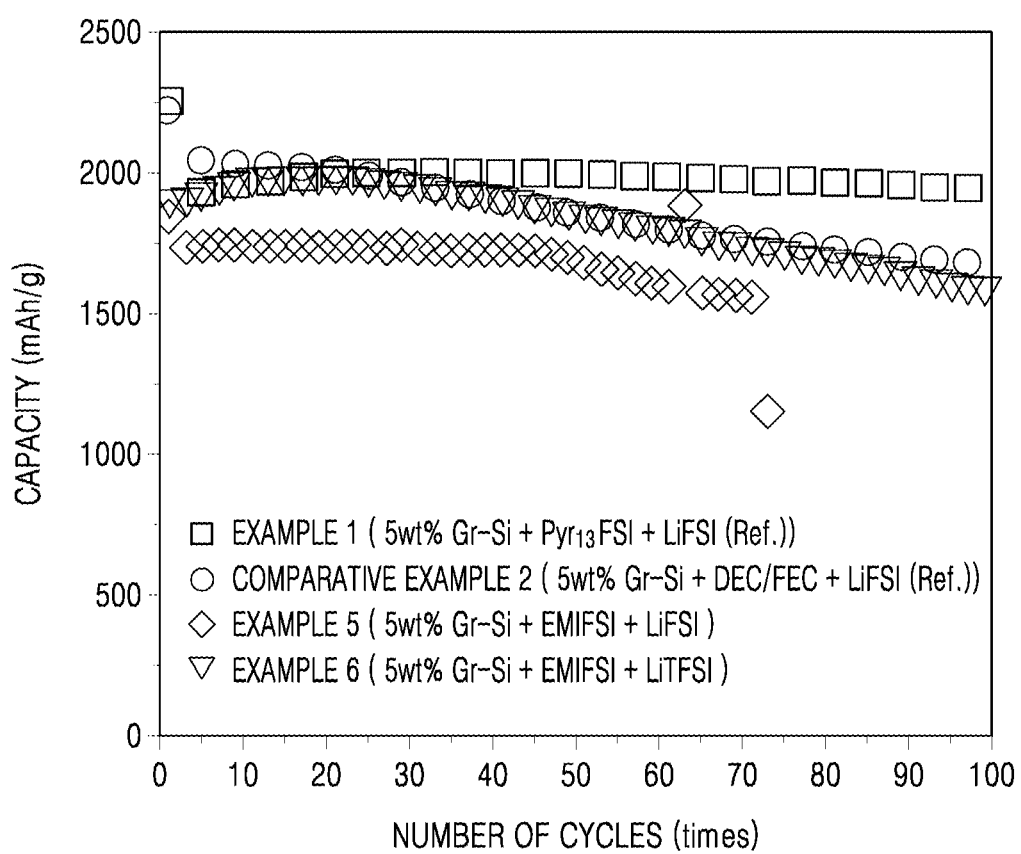
FIG. 11 is a graph showing capacity versus cycle number for coin cells manufactured according to Examples 1, 5, 6 and 8 and the coin cell of Comparative Example 2.
Figure 12:
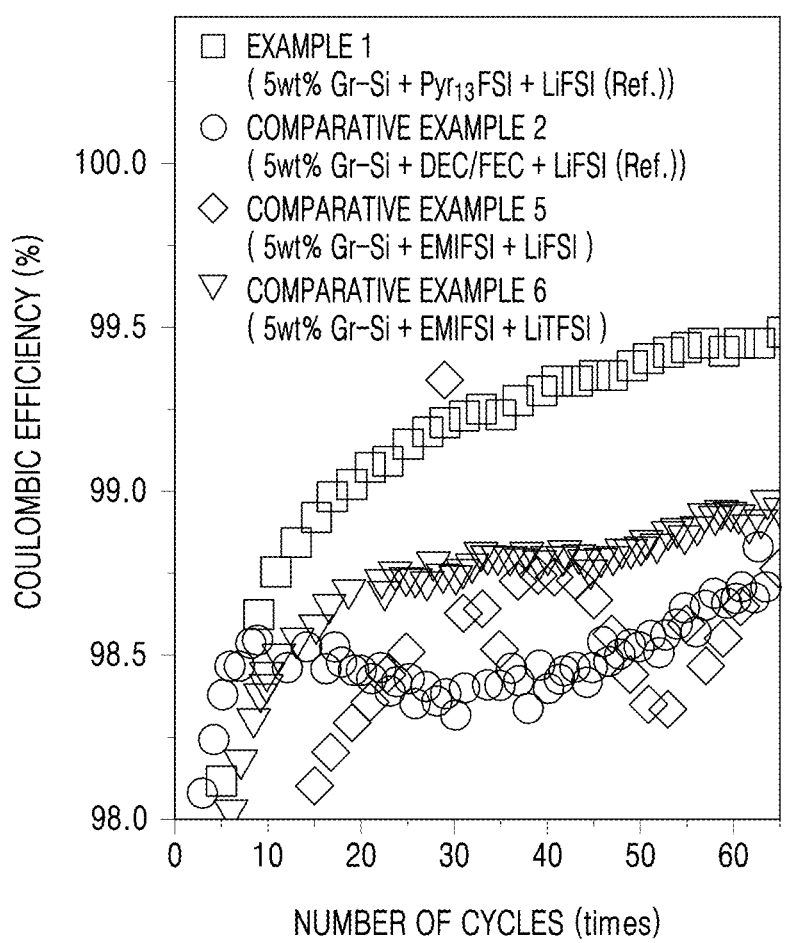
FIG. 12 is a graph showing charging/discharging efficiency versus cycle number for the coin cells of Examples 1, 5, 6 and 8 and Comparative Example 2.

Among the charging/discharging characteristic evaluation results of the coin cells of Examples 1, 5, 6 and 8 and Comparative Example 2, capacity evaluation results are shown in FIG. 11, and charging/discharging efficiency evaluation results are shown in FIG. 12. This experiment was conducted for evaluating changes in capacity retention and charging/discharging efficiency of a battery according to the kind of ionic liquid used.

Referring to FIGS. 11 and 12, the coin cell of Example 1 exhibited enhanced capacity retention and charging/discharging efficiency as a function of cycle number as compared to those of the coin cell of Comparative Example 2. In addition, it is confirmed that the coin cells of Examples 5, 7 and 8 including an electrolyte including an imidazole cation-containing ionic liquid exhibited the same level of capacity retention, while exhibiting a higher charging/discharging efficiency, as compared to the coin cells of Example 1 and Comparative Example 2.

4) Example 1 and Comparative Examples 1 to 3

Changes in charging/discharging efficiency and capacity retention of the coin cells of Example 1 and Comparative Examples 1 to 3 were evaluated using the same method as that used to evaluate the charging/discharging characteristics of the coin cells of Examples 1 to 4 and Comparative Example 1 described above.

Figure 13:
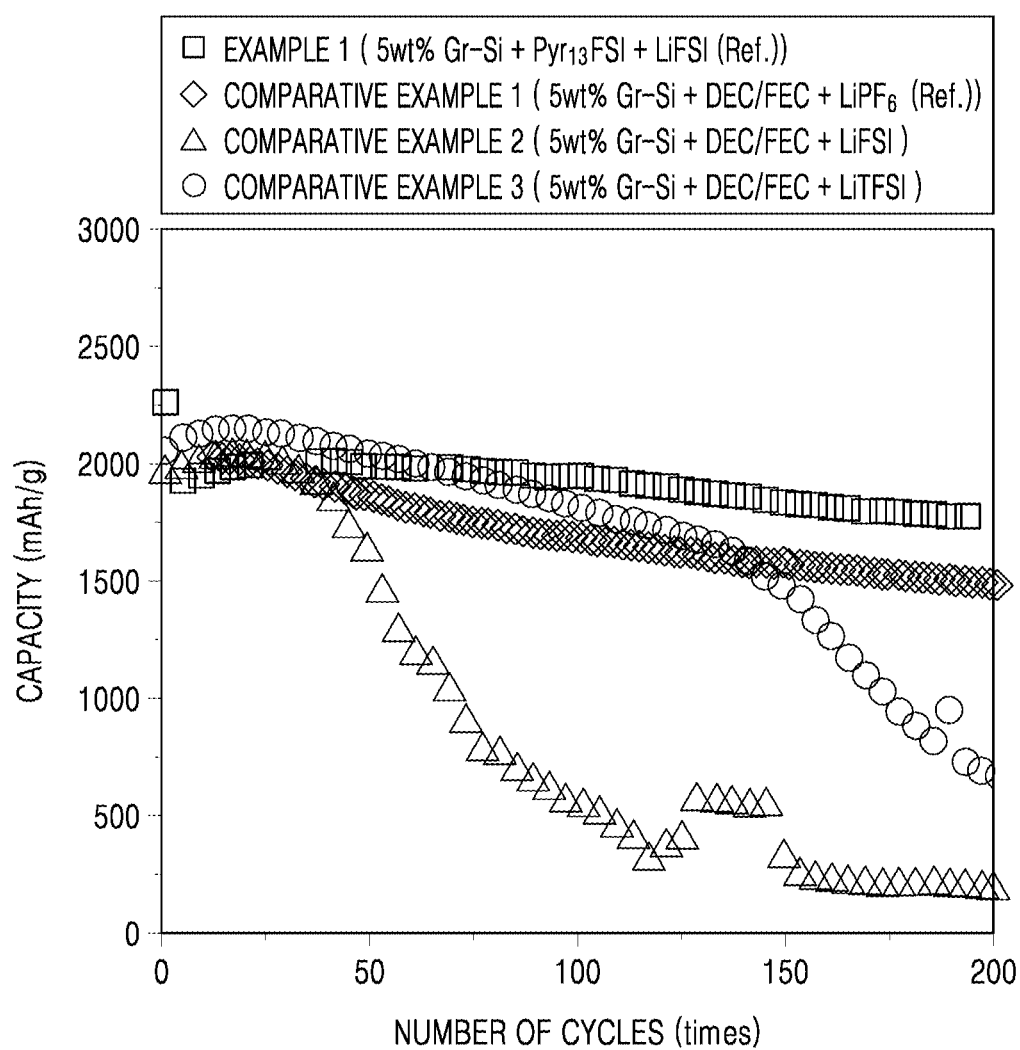
FIG. 13 is a graph showing capacity versus cycle number for the coin cells of Example 1 and Comparative Examples 1 to 3.
Figure 14:
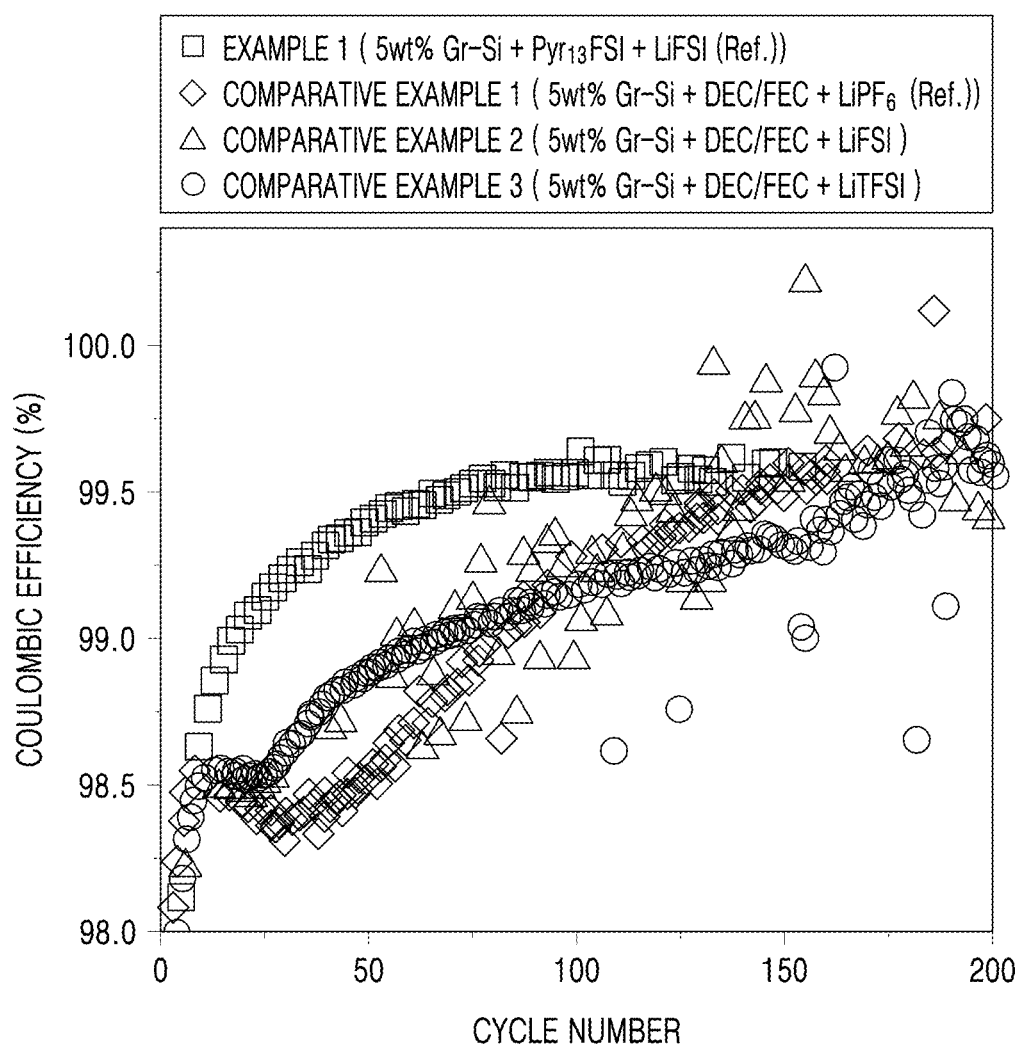
FIG. 14 is a graph showing coulombic efficiency (%) versus cycle number for the coin cells of Example 1 and Comparative Examples 1 to 3.

The evaluation results are shown in FIGS. 13 and 14.

Referring to FIGS. 13 and 14, it is confirmed that the coin cell of Example 1 exhibited enhanced capacity retention and charging/discharging efficiency as a function of cycle number as compared to the coin cells of Comparative Examples 1 to 3. From the results shown in FIGS. 13 and 14, it is confirmed that the coin cells using a carbonate organic solvent instead of an ionic liquid exhibited deteriorated capacity retention characteristics as compared to the coin cell of Example 1.

Evaluation Example 6: Measurement of Bending Durability and Change in Weight of Electrolyte First, the viscosity of the electrolyte in each of the pouch cells manufactured according to Examples 18 and 19 and Comparative Examples 11 and 12 was evaluated and the results thereof are shown in Table 3 below.

TABLE 3

|  | Viscosity of electrolyte (cp) |
|---|---|
| Example 18 | 150 |
| Example 19 | 223 |
| Comparative Example 11 | 18.5 |
| Comparative Example 12 | 20.5 |

As shown in Table 3, it is confirmed that the viscosity of the electrolyte in each of the pouch cells of Examples 18 and 19 was higher than that of each of the pouch cells of Comparative Examples 11 and 12. The pouch cells of Examples 18 and 19 used a high viscosity electrolyte and thus, when evaluating bending durability of each pouch cell, leakage of the electrolyte due to pinholes formed in the packaging did not occur, which is confirmed from evaluation results described below.

A bending test was conducted on the pouch cells of Examples 18 and 19 and Comparative Examples 11 and 12. The bending test was conducted such that each pouch cell was fixed on a sponge, a cylinder having a radius of 2.5 cm was positioned at 90° with respect to each pouch cell, and bending of the central portion of each cell was repeated through a piston motion.

Figure 15:
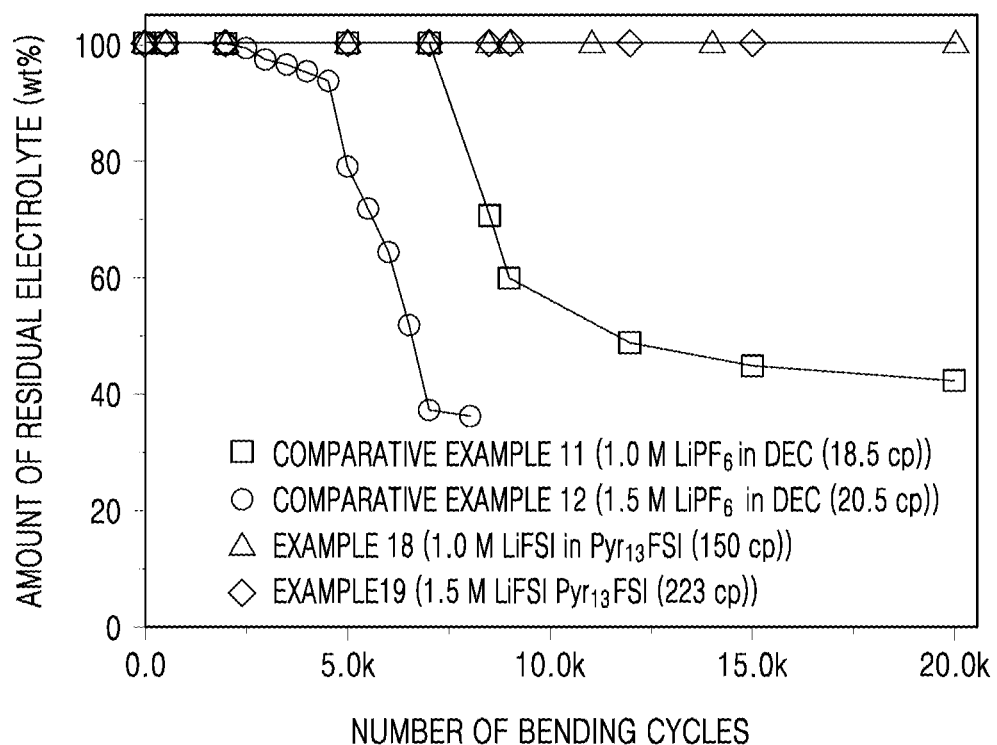
FIG. 15 is a graph showing amount of residual electrolyte (weight percent, "wt %") versus number of bending cycles for coin cells manufactured according to Examples 18 and 19 and Comparative Examples 11 and 12.

The change in the weight of the electrolyte of each cell before and after the bending test is shown in FIG. 15.

Referring to FIG. 15, there was no change in the weight of the electrolyte of each of the pouch cells of Examples 18 and 19 before and after the bending test, as compared to the pouch cells of Comparative Examples 11 and 12. By contrast, the pouch cells of Comparative Examples 11 and 12 exhibited a large change in the weight of the electrolyte after the bending test.

Figure 16A:
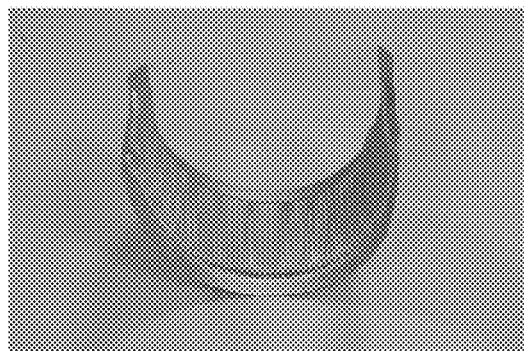
FIGS. 16A to 16H are images showing bending test results for the coin cells of Example 18 and Comparative Example 11, respectively.
Figure 16B:
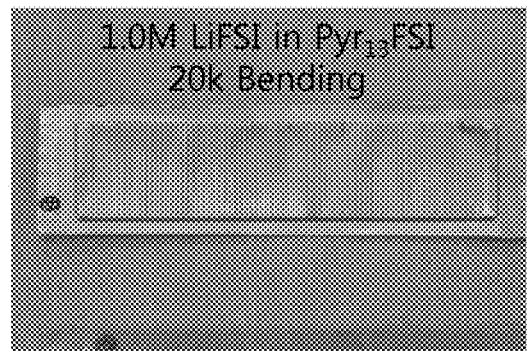
Figure 16C:
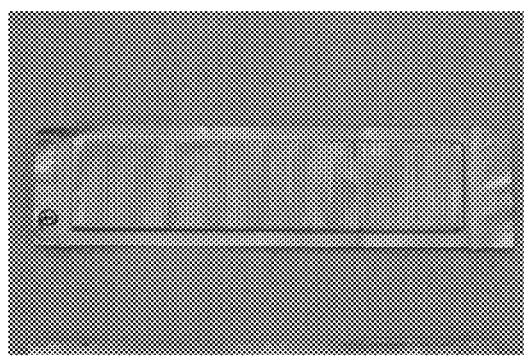
Figure 16D:
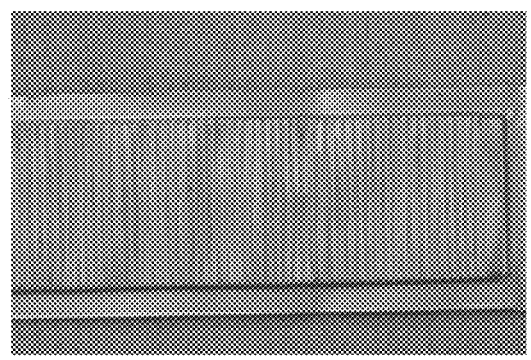
Figure 16E:
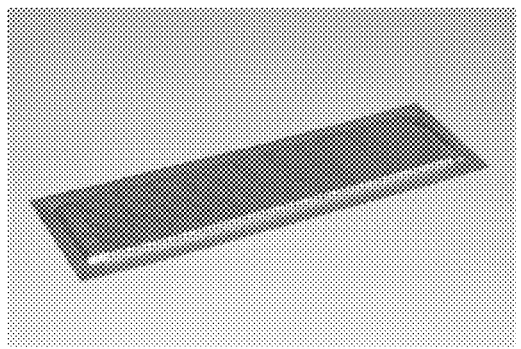
Figure 16F:
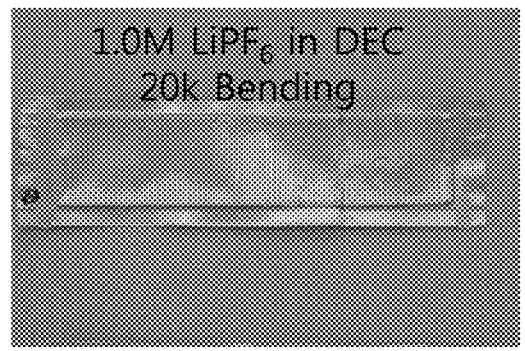
Figure 16G:
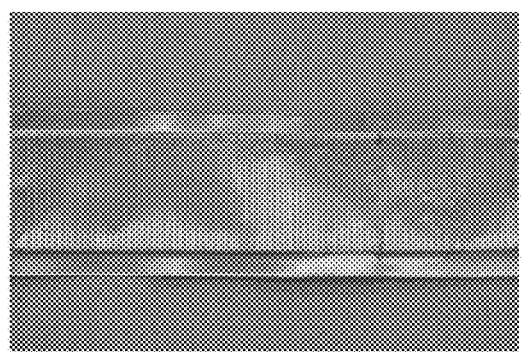
Figure 16H:
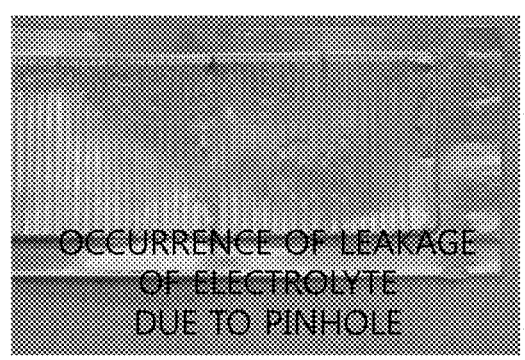

In addition, photographs for evaluation of durability after the bending teat of the pouch cells of Example 18 and Comparative Example 11 are shown in FIGS. 16A and 16B, respectively.

Referring to FIGS. 16A and 16B, the electrolyte of the pouch cell of Comparative Example 11 leaked as illustrated in FIG. 15 due to pinholes formed in the packaging (pouch), while leakage of the electrolyte of the pouch cell of Example 18 did not occur even after 20 k (20,000) times of bending. From the results, it is confirmed that the pouch cells of Examples 18 and 19 exhibited enhanced structural stability and durability for bending, and included a high viscosity electrolyte and accordingly, no leakage of electrolyte occurred.

Evaluation Example 7: Transmission Electron Microscopy (TEM) Analysis

TEM analysis was performed on the composites of Preparation Examples 1 and 3 and the results are shown in FIGS. 17A to 17D.

The TEM analysis was performed using a Titan cubed 60-300 (available from FEI).

Figure 17A:
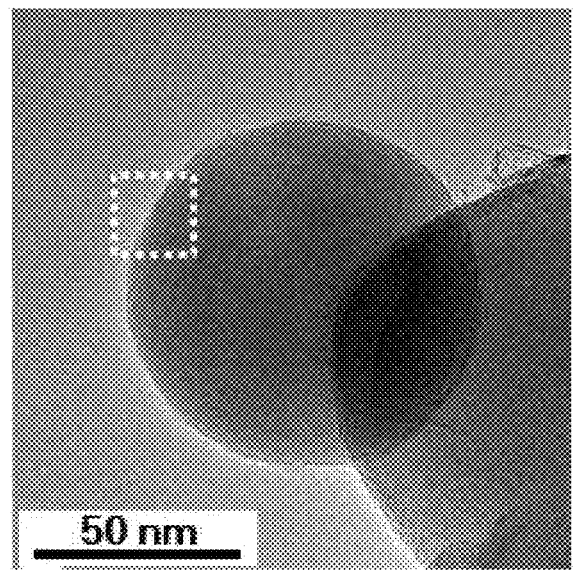
FIGS. 17A and 17C are transmission electron microscope (TEM) images of a composite prepared according to Preparation Example 1.
Figure 17B:
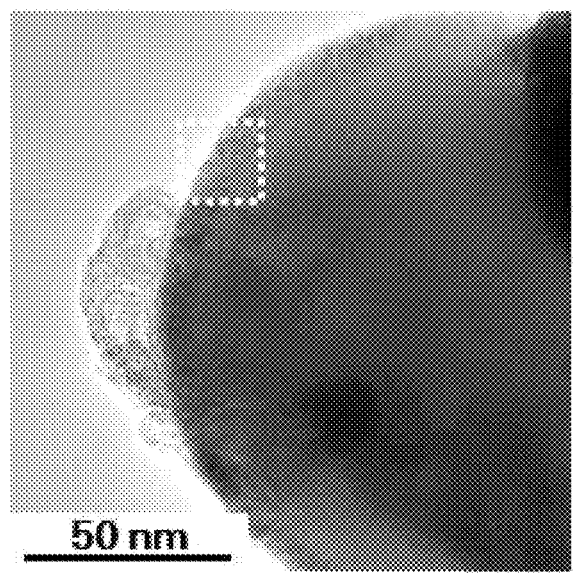
FIGS. 17B and 17D are TEM images of a composite prepared according to Preparation Example 3.
Figure 17C:
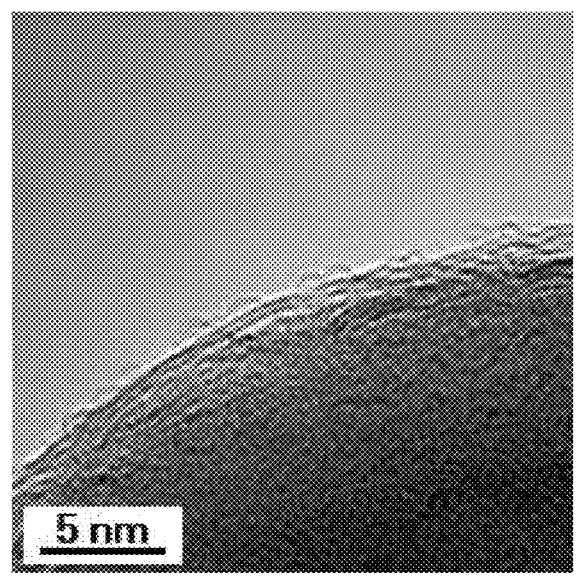

FIG. 17A illustrates TEM analysis results of the composite of Preparation Example 1, and FIG. 17C is a higher magnification image of the area in FIG. 17A denoted by the dotted square.

Figure 17D:
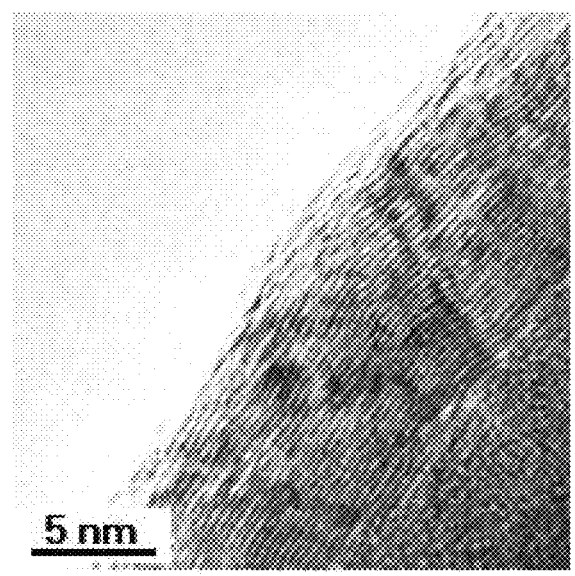

FIG. 17B illustrates TEM analysis results of the composite of Preparation Example 3, and FIG. 17D is a higher magnification image of the area in FIG. 17B denoted by the dotted square.

Referring to FIGS. 17A to 17D, it is confirmed that each of the composites of Preparation Examples 1 and 3 had a structure in which a graphene film is grown on silicon nanoparticles with a silicon oxide ($SiO_x$) film formed thereon. A region represented by the square in FIGS. 17A and 17B indicates that a graphene film is formed on a silicon oxide film.

In addition, referring to FIGS. 17C and 17D, it is confirmed that the composites of Preparation Examples 1 and 3 had a structure in which a graphene film is uniformly laminated on silicon nanoparticles with a silicon oxide ($SiO_x$) film formed thereon, the graphene film had a four or more-layered structure, e.g., a four- to ten-layered structure, and the layers of graphene have an interlayer distance of from about 3.4 Å to about 3.7 Å. In addition, in the composites of Preparation Examples 1 and 3, it was observed that graphene extended from the silicon of the silicon oxide ($SiO_x$ where $0<x<2$) film by a distance of 1 nm or less and the graphene was oriented at an angle between about 0° and about 90° with respect to the primary axis of the silicon. In addition, in the composites of Preparation Examples 1 and 3, it is confirmed that 90% or more, particularly 99% to 100% of the graphene extended from the silicon nanoparticles with a silicon oxide ($SiO_x$) film formed thereon by a distance of 1 nm or less.

In addition, the mixture of Comparative Preparation Example 4 was analyzed using TEM. As a result of analysis, graphene of the mixture of Comparative Preparation Example 4 was not uniformly present on the silicon nanoparticles with a silicon oxide film formed thereon. In addition, in the mixture of Comparative Preparation Example 4, the distance between the graphene and the silicon of the silicon oxide ($SiO_x$ where $0<x<2$) was large and not uniform, and a multilayered structure of the graphene was not observed on the silicon nanoparticles.

Evaluation Example 8: Raman Analysis

Raman analysis was performed on the composite of Preparation Example 3, the mixture of Comparative Preparation Example 1, and the silicon nanoparticles with an amorphous carbon film formed thereon of Comparative Preparation Example 2. The Raman analysis was performed using a Raman 2010 Spectra instrument (NT-MDT Development Co.) with a laser system having a wavelength of 473 nm, 633 nm, and 785 nm, a lowest Raman shift up to about 50 $cm^{-1}$, and a spatial resolution of about 500 nm.

Figure 18:
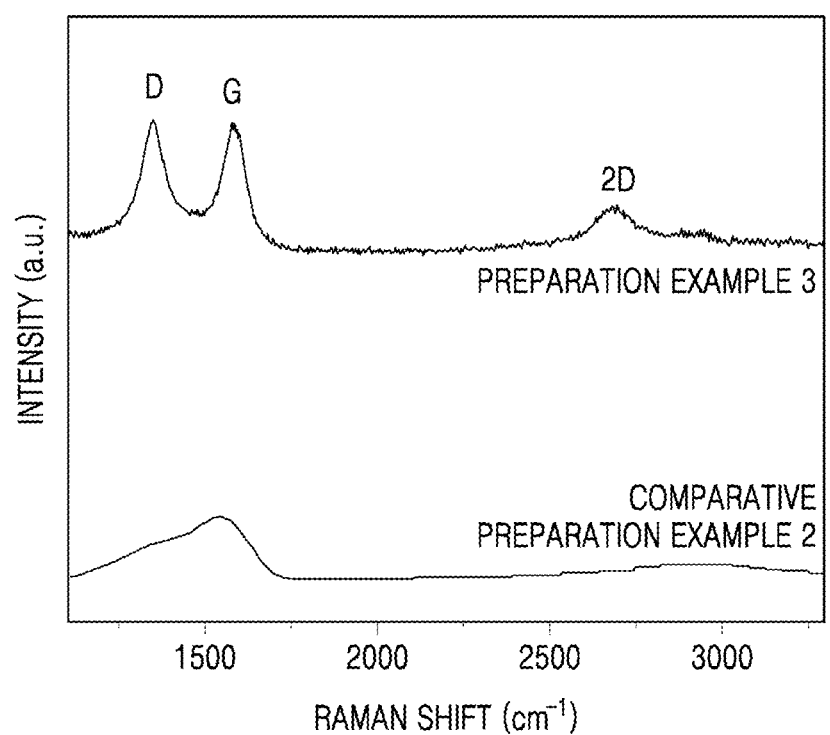
FIG. 18 is a graph showing Raman spectra (intensity (a.u.) versus Raman shift (centimeter$^{-1}$ "cm$^{-1}$") for the composite of Preparation Example 3 and silicon nanoparticles with an amorphous carbon film formed thereon, prepared according to Comparative Preparation Example 2.

FIG. 18 illustrates the results of Raman analysis of the composite of Preparation Example 3 and the silicon nanoparticles with an amorphous carbon film formed thereon of Comparative Preparation Example 2.

Based on the results shown in FIG. 18, the intensity ratio of the D peak and G peak and the G/2D intensity ratio were measured and shown in Table 4 below. Graphene has peaks at 1350 $cm^{-1}$, 1580 $cm^{-1}$, and 2700 $cm^{-1}$ in a Raman analytical spectrum, which provide information about the thickness, crystallinity, and charge doping state. The peak at 1580 $cm^{-1}$ is a peak referred to as "G-mode" which is generated from a vibration mode corresponding to stretching of a carbon-carbon bond, and the energy of the G-mode is determined by a density of excess electrical charge doped by the graphene. Also, the peak at 2700 $cm^{-1}$ is a peak referred to as "2D-mode" which is useful in evaluating the thickness of the graphene. The peak at 1350 $cm^{-1}$ is a peak referred to as "D-mode", which is present when there is a defect in the $SP^2$ crystal structure. Also, the D/G intensity ratio provides information about the entropy of the crystals of graphene.

TABLE 4

|  | D/G intensity ratio | G/2D intensity ratio | Position of 2D peak ($cm^{-1}$) |
| --- | --- | --- | --- |
| Comparative Preparation Example 1 | ~0 | 1.3 | 2730 |
| Comparative Preparation Example 2 | ~0 | N/A | N/A |
| Preparation Example 3 | 1.1 | 2.4 | 2680 |

Referring to Table 4 and FIG. 18, the graphene of the composite of Preparation Example 3 exhibited a larger D/G intensity ratio and a larger G/2D intensity ratio as compared to the mixture of Comparative Preparation Example 1 and the silicon nanoparticles with an amorphous carbon film formed thereon of Comparative Preparation Example 2.

As illustrated in FIG. 18, the composite of Preparation Example 3 had a 2D peak and exhibited a G/2D intensity ratio of greater than 1.

Meanwhile, Raman analysis was performed on the mixture of Comparative Preparation Example 1 and the silicon nanoparticles with an amorphous carbon film formed thereon of Comparative Preparation Example 2 by using the same method as that used for the Raman analysis of the composite of Preparation Example 3.

As a result of Raman analysis, the mixture of Comparative Preparation Example 1 showed only D and 2D peaks unlike the composite of Preparation Example 3 and the 2D peak of the mixture of Comparative Preparation Example 1 was observed at a different position from that of the composite of Preparation Example 3.

In addition, the silicon nanoparticles with an amorphous carbon film formed thereon of Comparative Preparation Example 2 exhibited only a broad G peak unlike the composite of Preparation Example 3.

Evaluation Example 9: IR (Infrared) Analysis

An electrolyte, prepared in the same manner as in Example 2, except that the amount of LiTFSI was changed to 0.5M, was used as a sample. IR analysis was performed on the electrolyte (0.5M LiTFSI in P13FSI) and the results thereof are shown in FIG. 19.

The IR analysis was performed using a Nicolet 5700 instrument available from Scientific.

Figure 19:
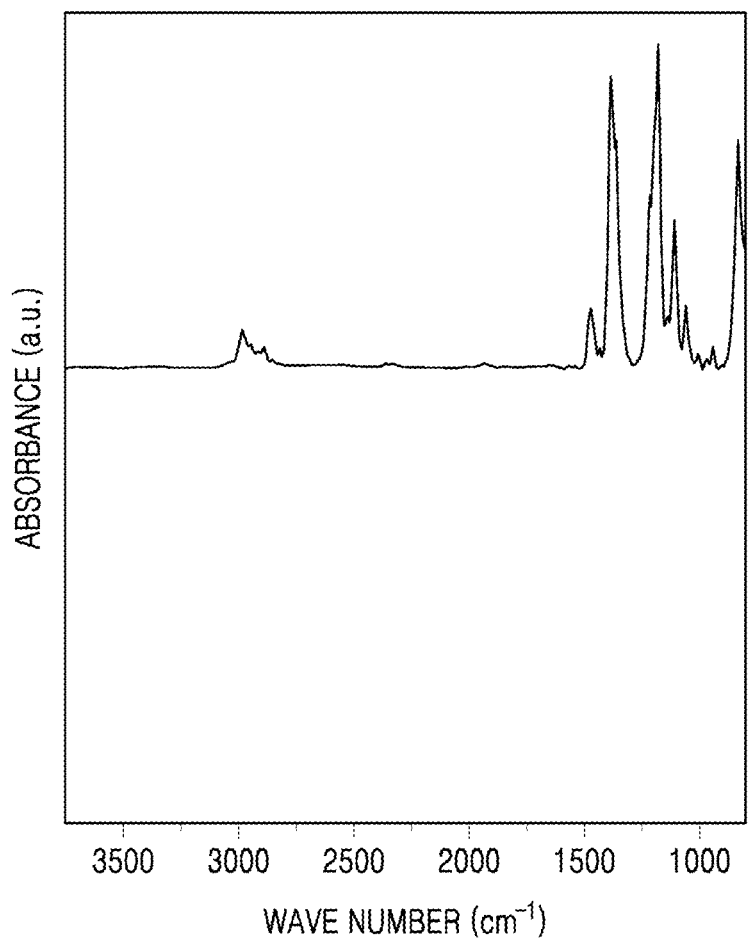
FIG. 19 is a graph showing an infrared (IR) spectrum (absorbance (arbitrary units "a.u.") versus wave number (centimeter$^{-1}$ "cm$^{-1}$")) for an electrolyte used in Example 2.

Referring to FIG. 19, the presence of the ionic liquid (P13FSI) containing an FSI anion was confirmed at strong peaks having wave numbers of 1380 $cm^{-1}$, 1220 $cm^{-1}$, and 1110 $cm^{-1}$.

As is apparent from the foregoing description, in a lithium secondary battery according to an embodiment, a stable SEI layer is disposed on a surface of a negative active material and thus a side reaction of an electrolyte is suppressed and overcharging is prevented, whereby the lithium secondary battery has enhanced charging/discharging efficiency and capacity retention ratio.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood by those of ordinary skill in the art that various changes in form and details may be made therein without departing from the spirit and scope as defined by the following claims.

What is claimed is:

1. A lithium secondary battery comprising:
a negative electrode;
a positive electrode; and
an electrolyte disposed between the negative electrode and the positive electrode,
wherein the negative electrode comprises
i) a silicon composite comprising
a core of silicon (Si),
a layer of silicon oxide of formula $SiO_x$ wherein $0<x<2$ disposed directly on the silicon (Si) core, and
graphene grown directly on the silicon oxide layer; or
ii) a carbonaceous composite comprising
the silicon composite, and
a carbonaceous material, which is different from the graphene, and
wherein at least one of the negative electrode and the electrolyte comprises an ionic liquid containing a fluorosulfonyl imide anion and a lithium salt.

2. The lithium secondary battery of claim 1, wherein the fluorosulfonyl imide anion comprises $(FSO_2)_2N^-$, $(CF_3SO_2)_2N^-$, $(C_2F_5SO_2)_2N^-$, $(C_2F_5SO_2)(CF_3SO_2)N^-$, or $(FSO_2)(CF_3SO_2)N^-$.

3. The lithium secondary battery of claim 1, wherein the ionic liquid containing a fluorosulfonyl imide anion comprises
at least one cation selected from an ammonium cation, a pyrrolidinium cation, a pyridinium cation, a pyrimidinium cation, an imidazolium cation, a piperidinium cation, a pyrazolium cation, an oxazolium cation, a pyridazinium cation, a phosphonium cation, a sulfonium cation, and a triazolium cation; and
at least one anion selected from $(FSO_2)_2N^-$, $(CF_3SO_2)_2N^-$, $(C_2F_5SO_2)_2N^-$, $(C_2F_5SO_2)(CF_3SO_2)N^-$, and $(FSO_2)(CF_3SO_2)N$.

4. The lithium secondary battery of claim 1, wherein the ionic liquid containing a fluorosulfonyl imide anion is at least one selected from N-methyl-N-propylpyrrolidinium bis(fluorosulfonyl)imide, N-methyl-N-propylpyrrolidinium bis(trifluoromethanesulfonyl)imide, N-butyl-N-methylpyrrolidinium bis(3-trifluoromethylsulfonyl)imide, N-butyl-N-methylpyrrolidinium bis(fluorosulfonyl)imide, 1-butyl-3-methylimidazolium bis(trifluoromethylsulfonyl)imide, 1-butyl-3-methylimidazolium bis(fluorosulfonyl)imide, 1-ethyl-3-methylimidazolium bis(trifluoromethylsulfonyl)imide, and 1-ethyl-3-methylimidazolium bis(fluorosulfonyl)imide.

5. The lithium secondary battery of claim 1, wherein an amount of the ionic liquid containing a fluorosulfonyl imide anion is in a range of about 1 part by weight to about 95 parts by weight, based on 100 parts by weight of the electrolyte.

6. The lithium secondary battery of claim 1, wherein an amount of the lithium salt is in a range of about 0.2 molar to about 2 molar.

7. The lithium secondary battery of claim 1, wherein the lithium salt is at least one selected from LiSCN, $LiN(CN)_2$, $LiClO_4$, $LiBF_4$, $LiAsF_6$, $LiPF_6$, $LiCF_3SO_3$, $Li(CF_3SO_2)_2N$, $LiSbF_6$, $Li(CF_3SO_2)_3C$, $LiPF_3(CF_2CF_3)_3$, $LiPF_3(CF_3)_3$, $LiB(C_2O_4)_2$, $Li(FSO_2)_2N$, $LiN(SO_2C_2F_5)(CF_3SO_2)$, $LiN(SO_2C_2F_5)_2$, $LiPF_3(CF_2CF_3)_3$, LiCl, and LiI.

8. The lithium secondary battery of claim 1, wherein the graphene is in a form of a nanosheet or a film.

9. The lithium secondary battery of claim 1, wherein an amount of the graphene is in a range of about 0.001 part by weight to about 90 parts by weight, based on 100 parts by weight of the silicon composite.

10. The lithium secondary battery of claim 1, wherein a distance between the graphene and a silicon of the silicon oxide layer is about 10 nanometers or less,
the graphene comprises at least one to 20 graphene layers,
a total thickness of the graphene is in a range of about 0.6 nanometer to about 12 nanometers, and
the graphene is oriented at an angle ranging from about 0° to about 90° with respect to a primary axis of the silicon.

11. The lithium secondary battery of claim 1, wherein the graphene extends from a silicon of the silicon oxide layer by a distance of about 1 nanometer or less, and the graphene is oriented at an angle from about 0° to about 90° with respect to a primary axis of the silicon.

12. The lithium secondary battery of claim 1, wherein a thickness of the silicon oxide layer is about 300 micrometers or less.

13. The lithium secondary battery of claim 1, wherein a thickness of the silicon oxide layer is in a range of about 0.1 nanometer to about 10 nanometers.

14. The lithium secondary battery of claim 1, wherein a 2D peak of the graphene, obtained by Raman analysis, is present at about 2,600 inverse centimeters to about 2,800 inverse centimeters.

15. The lithium secondary battery of claim 1, wherein a D/G intensity ratio of the graphene, obtained by Raman analysis, is in a range of about 1 to about 4.

16. The lithium secondary battery of claim 1, wherein a G/2D intensity ratio of the graphene, obtained from Raman analysis, is in a range of about 1 to about 6.

17. The lithium secondary battery of claim 1, wherein a viscosity of the electrolyte is in a range of about 50 centipoise to about 300 centipoise.

18. The lithium secondary battery of claim 1, wherein the lithium secondary battery is a flexible battery.

19. The lithium secondary battery of claim 1, further comprising at least one metal oxide selected from a magnesium oxide, a manganese oxide, an aluminum oxide, a titanium oxide, a zirconium oxide, a tantalum oxide, a tin oxide, and a hafnium oxide.

20. The lithium secondary battery of claim 1, wherein the silicon has an average particle diameter of from about 40 nanometers to about 40 micrometers.

21. The lithium secondary battery of claim 1, wherein the carbonaceous material in the carbonaceous composite is at least one selected from graphene, graphite, and carbon nanotubes.

22. The lithium secondary battery of claim 1, wherein the silicon composite further comprises silicon carbide on the silicon oxide.

* * * * *